United States Patent
Rico Alvarino et al.

(10) Patent No.: US 10,129,877 B2
(45) Date of Patent: Nov. 13, 2018

(54) PAGING FOR MACHINE TYPE COMMUNICATION DEVICES

(71) Applicant: QUALCOMM Incorporated, San Diego, CA (US)

(72) Inventors: Alberto Rico Alvarino, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 15/431,741

(22) Filed: Feb. 13, 2017

(65) Prior Publication Data
US 2017/0273078 A1    Sep. 21, 2017

Related U.S. Application Data

(60) Provisional application No. 62/309,441, filed on Mar. 16, 2016.

(51) Int. Cl.
*H04W 72/04* (2009.01)
*H04W 76/11* (2018.01)
(Continued)

(52) U.S. Cl.
CPC ....... *H04W 72/0446* (2013.01); *H04W 68/00* (2013.01); *H04W 68/005* (2013.01);
(Continued)

(58) Field of Classification Search
CPC . H04W 72/0446; H04W 76/11; H04W 68/00; H04W 68/005; H04W 72/042
See application file for complete search history.

(56) References Cited

U.S. PATENT DOCUMENTS

2008/0081613 A1* 4/2008 Yang .................. H04W 68/025
455/426.1
2009/0268910 A1* 10/2009 Liu ..................... H04J 11/0079
380/268
(Continued)

OTHER PUBLICATIONS

Catt, "Paging Coverage Improvement Details for MTC UEs," 3GPP TSG RAN WG1 Meeting #76, R1-140079, Prague, Czech Republic, Feb. 10-14, 2014, 3 pgs., XP050735645, 3rd Generation Partnership Project.

(Continued)

*Primary Examiner* — Ronald B Abelson
(74) *Attorney, Agent, or Firm* — Nerrie M. Zohn

(57) ABSTRACT

Methods, systems, devices, or apparatuses may support paging for machine type communication (MTC) devices. In one example, a base station may identify a mode of operation to be used for MTC. Based on the identified mode of operation, the base station may determine a subframe to be used for a paging occasion for a user equipment (UE) with which the base station communicates using MTC. A base station may also repeat a page in a number of subframes according to a repetition level for a paging occasion. The page may be for one or more UEs using MTC. The base station may identify the starting subframe for the paging occasion. The base station may then transmit the page based at least in part on the repetition level, where the page may be scrambled by the base station based at least in part on the starting subframe.

30 Claims, 16 Drawing Sheets

(51) Int. Cl.
*H04W 68/00* (2009.01)
*H04W 4/70* (2018.01)

(52) U.S. Cl.
CPC .......... *H04W 72/042* (2013.01); *H04W 76/11* (2018.02); *H04W 4/70* (2018.02)

(56) References Cited

U.S. PATENT DOCUMENTS

2013/0279485 A1* 10/2013 Gao .................. H04W 72/0466
2017/0019216 A1* 1/2017 Li ........................... H04W 4/70

OTHER PUBLICATIONS

Huawei et al., "Paging Transmission for MTC UEs," 3GPP TSG RAN WG1 Meeting #80, R1-150064, Athens, Greece, Feb. 9-13, 2015, 3 pgs., XP050933281, 3rd Generation Partnership Project.
ISA/EP, International Search Report and Written Opinion of the International Searching Authority, Int'l Application No. PCT/US2017/017764, May 4, 2017, European Patent Office, Rijswijk, NL, 13 pgs.
Qualcomm Incorporated, "System Information and Paging," 3GPP TSG RAN1 Meeting #84-BIS, R1-163012, Busan, South Korea, Apr. 11-15, 2016, 5 pgs., XP051080743, 3rd Generation Partnership Project.

* cited by examiner

PAGING FOR MACHINE TYPE COMMUNICATION DEVICES

CROSS REFERENCES

The present application for patent claims priority to U.S. Provisional Patent Application No. 62/309,441 by RICO ALVARINO, et al., entitled "PAGING FOR MACHINE TYPE COMMUNICATION DEVICES," filed Mar. 16, 2016, and assigned to the assignee hereof, the entirety of which is expressly incorporated by reference herein for any and all purposes.

BACKGROUND

The following relates generally to wireless communication, and more specifically to paging for machine type communication (MTC) devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

In some cases, a base station may signal to a UE that paging and/or system information is available in a channel for one or more of the UEs by sending a paging message during a particular subframe, which may be referred to as a paging occasion, for those one or more UEs. Some systems have multiple subframes of a radio frame available for paging. A UE may monitor its particular paging occasion, in a particular subframe, to receive the paging message to determine that paging information and/or system information is available for the UE.

In some cases, a UE may be a low-cost or low-complexity MTC device (e.g., including an internet of things (IoT) device, machine to machine (M2M) communications device, etc.). Certain MTC devices may communicate with a base station in a narrow subband or narrowband regions of the system bandwidth of a wireless communications system. Such UEs may be referred to as narrowband devices. Because of the reduced bandwidth available for communications between a base station and narrowband device, certain signals provided by the base station may have reduced opportunities for transmission, which may impact certain UE operations. For paging operations, narrowband operation may reduce the number of subframes available for paging messages, effectively limiting the paging capacity and impacting system performance. In some instances, many of the subframes may be occupied with other data or control information, for example the subframes may be assigned to be multimedia broadcast single frequency network (MBSFN) subframes, or for synchronization signals, or some other predetermined purpose that limits subframes availability for paging. Limiting the number of subframes available for paging messages may increase the number of collisions between UEs monitoring the subframe for paging messages and/or reduce overall paging capacity.

In some circumstances, there may be many MTC devices (e.g., UEs) monitoring a limited number of paging occasions. A control channel carrying the paging message may be repeated a certain number of times to increase the probability of successful receipt of a paging message by one or more UEs intended to receive the paging message during a given paging occasion. However, in some cases the repeated paging message for a first UE intended to receive the paging message may overlap with paging occasions for other UEs that are not intended to be recipients of the paging message. If these other UEs successfully decode the paging message, they may determine that there is paging information available for them, when the paging information is actually for the first UE. Thus, the one or more UEs may stay awake longer than needed (e.g., beyond the time of the paging occasion to decode subsequently-received paging information) only to discover that the subsequently-received paging information is for a different UE. Remaining awake may use excessive power and drain battery life for the one or more UEs.

SUMMARY

The described techniques relate to improved methods, systems, devices, or apparatuses that support paging for machine type communication (MTC) devices (e.g., including paging for machine to machine (M2M) devices, and internet of things devices (IoT), such as narrowband IoT devices). A base station may identify a mode of operation to be used for MTC. Based on the identified mode of operation, the base station may determine a subframe to be used for a paging occasion for a user equipment (UE) with which the base station communicates using MTC. For example, if the base station determines that the mode of operation is an in-band mode of operation, then the base station may determine that there is only a single subframe of each radio frame available for the base station to use for paging. In another example, if the base station determines that the mode of operation is either a stand-alone or guard band mode of operation, then the base station may determine that there are multiple subframes available of each subframe for the base station to use for paging.

A base station may also communicate with one or more UEs using a particular multimedia broadcast single frequency network (MBSFN) subframe configuration. The base station may identify at least one of the potential MBSFN subframes is designated for the base station to use for paging. Based on the identified paging configuration, the base station may then determine a subframe to use for a paging occasion. The base station may make this determination based at least in part on whether a particular subframe is available, and whether the subframe has previously been selected for a paging occasion. In some examples, a subframe may be selected such that the selected subframe overrides a portion of the MBSFN subframe configuration for a radio frame.

A base station may also repeat a page or paging message in a number of subframes according to a repetition level for a paging occasion. In some cases, a subframe configured to carry a paging message for a UE may be referred to as a paging subframe. Furthermore, different UEs may be associated with a different set of paging subframes. The paging message may be for one or more UEs (e.g., MTC devices). The base station may identify the starting subframe for the paging occasion. In some cases, the base station may process one or more paging messages for a UE of the one or more UEs based in part on the starting subframe. For example, the base station may scramble one or more paging messages with a scrambling sequence that is based at least in part on the starting subframe. In some other examples, the scrambling sequence for each paging message in a sequence of repeated paging messages may be based on a number of prior repetitions of the paging message. The base station may then transmit the one or more paging messages according to the repetition level in a set of paging subframes.

A UE may receive one or more paging messages from a base station via a control channel. In some cases, the UE may identify a starting subframe and a set of repetition levels used by the base station to page the UE. The UE may then initialize a descrambling sequence to process the repeating paging message based on a starting subframe. The descrambling sequence may correspond to the scrambling sequence that the base station used to scramble the paging message. The UE may then decode the one or more paging messages using the descrambling sequence. The UE may receive an indication of the starting subframe in a downlink control information (DCI) signal, or determine a paging-radio network temporary identifier (P-RNTI) associated with the identified starting subframe. In some cases, a portion of the one or more paging messages may comprise a cyclic redundancy check (CRC).

A method of wireless communication is described. The method may include identifying, at the base station, a mode of operation for MTC and determining, based at least in part on the identified mode of operation, at least one subframe of a radio frame to be used for a paging occasion for a UE with which the base station communicates using MTC.

An apparatus for wireless communication is described. The apparatus may include means for identifying, at the base station, a mode of operation for MTC and means for determining, based at least in part on the identified mode of operation, at least one subframe of a radio frame to be used for a paging occasion for a UE with which the base station communicates using MTC.

A further apparatus is described. The apparatus may include a processor, memory in electronic communication with the processor, and instructions stored in the memory. The instructions may be operable to cause the processor to identify, at the base station, a mode of operation for MTC and determine, based at least in part on the identified mode of operation, at least one subframe of a radio frame to be used for a paging occasion for a UE with which the base station communicates using MTC.

A non-transitory computer readable medium for wireless communication is described. The non-transitory computer-readable medium may include instructions to cause a processor to identify, at the base station, a mode of operation for MTC and determine, based on the identified mode of operation, at least one subframe of a radio frame to be used for a paging occasion for a UE with which the base station communicates using MTC.

In some examples of the method, apparatus, or non-transitory computer-readable medium described above, the radio frame has only one subframe available for paging occasions if the identified mode of operation is an in-band mode. In some examples of the method, apparatus, or non-transitory computer-readable medium described above, the radio frame has a set of subframes available for paging occasions if the identified mode of operation is a stand-alone mode or a guard band mode.

Some examples of the method, apparatus, or non-transitory computer-readable medium described above may further include processes, features, means, or instructions for broadcasting the paging occasion over a NB-PDSCH.

A method of wireless communication is described. The method may include identifying a MBSFN subframe configuration for the base station to communicate with one or more UEs, identifying a paging configuration in which at least one potential MBSFN subframe is designated as a subframe available for use by the base station to use to page the one or more UEs, and determining the paging occasion for a subframe of the radio frame based at least in part on the identified paging configuration.

An apparatus for wireless communication is described. The apparatus may include means for identifying a MBSFN subframe configuration for the base station to communicate with one or more UEs, means for identifying a paging configuration in which at least one potential MBSFN subframe is designated as a subframe available for use by the base station to use to page the one or more UEs, and means for determining the paging occasion for a subframe of the radio frame based at least in part on the identified paging configuration.

A further apparatus is described. The apparatus may include a processor, memory in electronic communication with the processor, and instructions stored in the memory. The instructions may be operable to cause the processor to identify a MBSFN subframe configuration for the base station to communicate with one or more UEs, identify a paging configuration in which at least one potential MBSFN subframe is designated as a subframe available for use by the base station to use to page the one or more UEs, and determine the paging occasion for a subframe of the radio frame based at least in part on the identified paging configuration.

A non-transitory computer readable medium for wireless communication is described. The non-transitory computer-readable medium may include instructions to cause a processor to identify a MBSFN subframe configuration for the base station to communicate with one or more UEs, identify a paging configuration in which at least one potential MBSFN subframe is designated as a subframe available for use by the base station to use to page the one or more UEs, and determine the paging occasion for a subframe of the radio frame based on the identified paging configuration.

In some examples of the method, apparatus, or non-transitory computer-readable medium described above, the MBSFN subframe configuration is used by the base station to communicate with one or more UEs during a radio frame of an MTC. In some examples of the method, apparatus, or non-transitory computer-readable medium described above, the identified paging configuration comprises a number of paging occasions per radio frame. In some examples of the method, apparatus, or non-transitory computer-readable medium described above, determining the paging occasion for the subframe is based on the identified paging configuration and the MBSFN subframe configuration.

In some examples of the method, apparatus, or non-transitory computer-readable medium described above, determining the paging occasion comprises: determining an available subframe of the radio frame. Some examples of the method, apparatus, or non-transitory computer-readable medium described above may further include processes, features, means, or instructions for determining whether the available subframe has previously been selected for a prior paging occasion. Some examples of the method, apparatus, or non-transitory computer-readable medium described above may further include processes, features, means, or instructions for determining the paging occasion for the subframe based on the identified paging information and the determination whether the available subframe has previously been selected for the prior paging occasion.

In some examples of the method, apparatus, or non-transitory computer-readable medium described above, determining the paging occasion comprises: overriding at least a portion of the MBSFN subframe configuration to accommodate the paging occasion based at least in the part on the identified paging configuration.

A method of wireless communication is described. The method may include identifying a starting subframe and a repetition level for a paging occasion, wherein the paging occasion is used by the base station to page one or more UEs, processing one or more paging messages for a UE of the one or more UEs based at least in part on the starting subframe, and transmitting at least one paging message according to the repetition level in a set of paging subframes.

An apparatus for wireless communication is described. The apparatus may include means for identifying a starting subframe and a repetition level used by the base station to page one or more UEs. In some cases, the apparatus may include means for processing one or more paging messages for a UE of the one or more UEs based at least in part on the starting subframe, and means for transmitting at least one paging message according to the repetition level in a set of paging subframes.

A further apparatus is described. The apparatus may include a processor, memory in electronic communication with the processor, and instructions stored in the memory. The instructions may be operable to cause the processor to identify a starting subframe and a repetition level for a paging occasion, wherein the paging occasion is used by the base station to page one or more UEs, process one or more paging messages for a UE of the one or more UEs based at least in part on the starting subframe, and transmit at least one paging message according to the repetition level in a set of paging subframes.

A non-transitory computer readable medium for wireless communication is described. The non-transitory computer-readable medium may include instructions to cause a processor to identify a starting subframe and a repetition level for a paging occasion, wherein the paging occasion is used by the base station to page one or more UEs, process paging messages for at least one UE based at least in part on the starting subframe, and transmit at least one paging message according to the repetition level in a set of paging subframes.

In some examples of the method, apparatus, or non-transitory computer-readable medium described above, the paging messages are scrambled based at least in part on the starting subframe. In some examples of the method, apparatus, or non-transitory computer-readable medium described above, the scrambling is based on the number of prior repetitions of the paging message or the starting subframe for the paging occasion, or a combination thereof. In some examples of the method, apparatus, or non-transitory computer-readable medium described above, transmitting the paging messages comprises transmitting a downlink control channel. (e.g., a physical downlink control channel (PDCCH), etc.).

In some examples of the method, apparatus, or non-transitory computer-readable medium described above, the starting subframe is a starting subframe number. In some examples of the method, apparatus, or non-transitory computer-readable medium described above, processing the paging messages may comprise generating a downlink control information (DCI) signal that comprises an indication of the starting subframe.

In some examples of the method, apparatus, or non-transitory computer-readable medium described above, transmitting the paging messages comprises: determining a P-RNTI associated with the identified starting subframe, and scrambling a portion of the paging message with the determined P-RNTI. Some examples of the method, apparatus, or non-transitory computer-readable medium described above may further include processes, features, means, or instructions for transmitting the paging message based at least on the determined P-RNTI. In some examples of the method, apparatus, or non-transitory computer-readable medium described above, transmitting the paging messages comprises scrambling a CRC with the determined P-RNTI.

A method of wireless communication is described. The method may include receiving, from a base station, one or more paging messages, and determining the presence of paging information for the UE based on processing the one or more paging messages based at least in part on the starting subframe of the paging occasion. In some cases, processing the one or more paging messages may comprise initializing a descrambling sequence for processing the one or more paging messages based at least in part on a starting subframe. In some other cases, the one or more paging messages may be decoded based at least in part on the descrambling sequence.

An apparatus for wireless communication is described. The apparatus may include means for receiving, from a base station, one or more paging messages, means for determining the presence of paging information for the UE based on processing the one or more paging messages based at least in part on the starting subframe of the paging occasion. In some cases, the means for processing the one or more paging messages may comprise, means for initializing a descrambling sequence to process the one or more paging messages based at least in part on a starting subframe, and means for decoding the one or more paging messages based at least in part on the descrambling sequence.

A further apparatus is described. The apparatus may include a processor, memory in electronic communication with the processor, and instructions stored in the memory. The instructions may be operable to cause the processor to identify a starting subframe and a repetition level for a paging occasion, wherein the paging occasion is used by a base station to page the UE, receive, from a base station, one or more paging messages, initialize a descrambling sequence for processing the one or more paging messages based at least in part on a starting subframe, and decode the one or more paging messages based at least in part on the descrambling sequence.

A non-transitory computer readable medium for wireless communication is described. The non-transitory computer-readable medium may include instructions to cause a processor to identify a starting subframe and a repetition level for a paging occasion, wherein the paging occasion is used by the base station to page the UE, receive, from a base station, one or more paging messages, initialize a descrambling sequence for the one or more paging messages based on a starting subframe, and decode the one or more paging messages based on the descrambling sequence.

Some examples of the method, apparatus, or non-transitory computer-readable medium described above may further include processes, features, means, or instructions for identifying the starting subframe and a set of repetition levels used by the base station to page the UE.

In some examples of the method, apparatus, or non-transitory computer-readable medium described above, receiving the one or more paging messages comprises:

receiving a downlink control channel, or receiving an indication of the starting subframe in a DCI signal, or a combination thereof.

In some examples of the method, apparatus, or non-transitory computer-readable medium described above, processing the one or more paging messages comprises: determining a P-RNTI associated with the identified starting subframe. Some examples of the method, apparatus, or non-transitory computer-readable medium described above may further include processes, features, means, or instructions for decoding a portion of the one or more paging messages based on the determined P-RNTI.

In some examples of the method, apparatus, or non-transitory computer-readable medium described above, the portion of the one or more paging messages comprises a CRC. In some examples of the method, apparatus, or non-transitory computer-readable medium described above, the one or more paging messages are received on a PDCCH.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
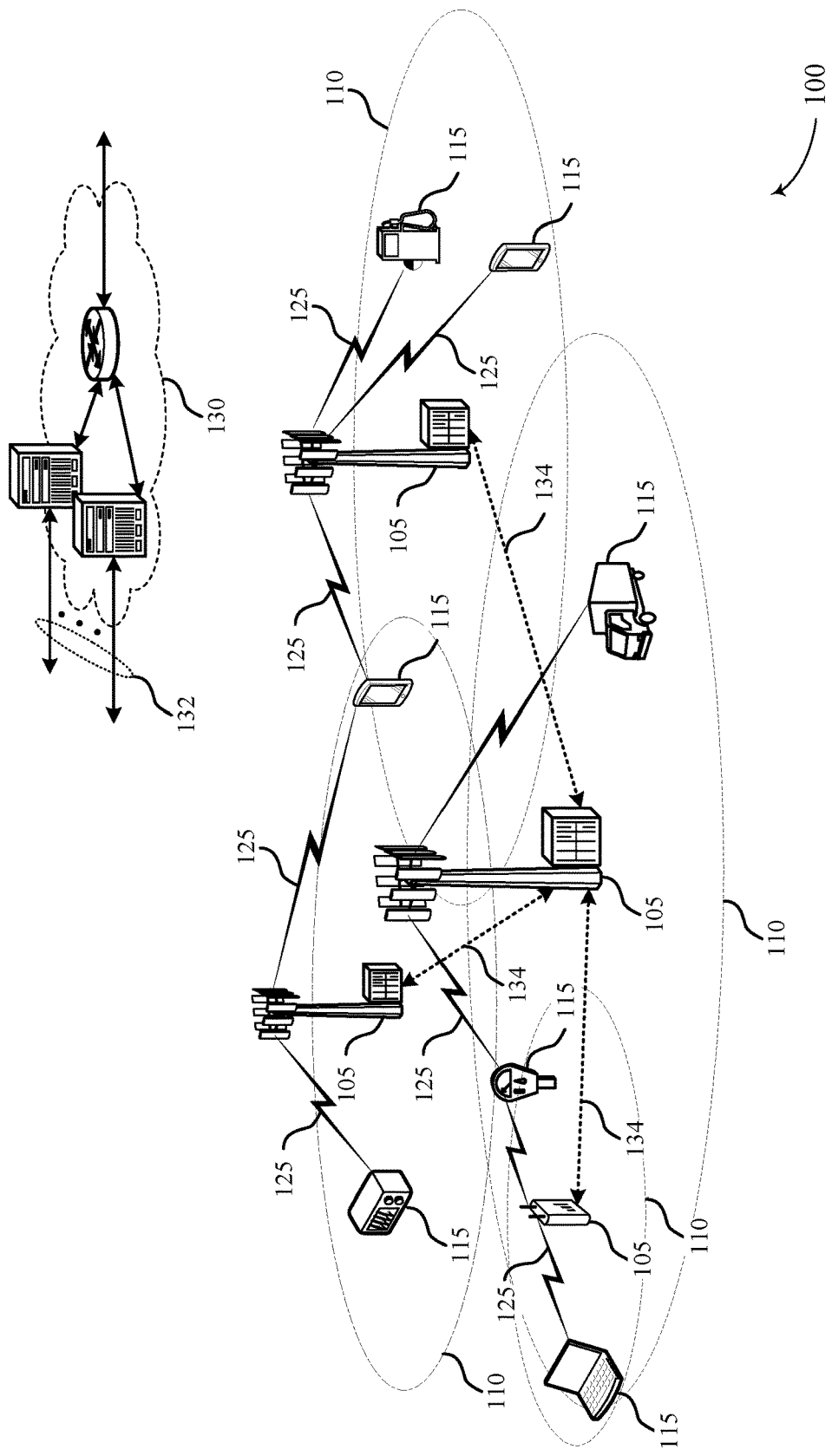
FIG. 1 illustrates an example of a wireless communications system that supports paging for MTC devices in accordance with aspects of the present disclosure.

In a wireless communication system, a base station may signal to user equipment (UE) that paging and/or system information is available in a channel for one or more of the UEs of the wireless communication system. The UEs may be low-cost or low-complexity machine type communication (MTC) devices (e.g., including an internet of things (IoT) device, machine to machine (M2M) communications device, etc.). These UEs may communicate in a narrow subband, or narrowband regions, of a system bandwidth of a wireless communications system (e.g., a subband dedicated for narrowband (NB) IoT (NB-IoT) communications. The base stations using MTC may send pages or paging messages to UEs to indicate that paging information is available for one or more of the UEs. In some examples, the paging messages may be sent using paging occasions of a downlink control channel. In some examples, the downlink control channel may be a Physical Downlink Control Channel (PDCCH), an MTC PDCCH (MPDCCH) used for MTC communications, or an NB-PDCCH. Paging occasions may be periodic intervals configured for paging messages, to allow the UEs to enter a sleep or discontinuous reception (DRX) state in between paging occasions. In some examples, the paging information may be sent in a Physical Downlink Shared Channel (PDSCH), which may be sent during the same or different subframes than the PDCCH.

The base station and UEs may communicate with one another according to different operating modes. For example, in a stand-alone operation mode, one or more carriers of a radio frequency (RF) spectrum previously used by another radio access technology (e.g., a GSM EDGE radio access network (GERAN)) may be used for MTC. In a guard band operation mode, unused resource blocks within a carrier's guard-band (e.g., a Long-Term Evolution (LTE), LTE-Advanced (LTE-A), or New Radio (NR) carrier, etc.) may be used for MTC. In an in-band operation mode, resource blocks within an LTE/LTE-A/NR carrier may be used for MTC. In some cases, when communicating in a narrow subband, some or all of the subframes may have been previously allocated for certain control and/or data, such as in an in-band mode of operation. For example, in some cases of in-band operation mode, the base station may determine that there is only a single subframe of a radio frame available for the base station to use for paging. Depending on the mode of operation, greater or fewer numbers of subframes may be available to the base station for paging operations.

A base station may identify a mode of operation to be used for MTC. A base station that is communicating with one or more UEs may select one or more subframes to use for paging based at least in part on the mode of operation. Based on the identified mode of operation, the base station may determine subframes to be used for paging occasions for a UE with which the base station communicates using MTC. A base station may also communicate with one or more UEs using a particular multimedia broadcast single frequency network (MBSFN) subframe configuration. The base station may identify at least one of the potential MBSFN subframes that is designated for the base station to use for paging. Based on the identified paging configuration, the base station may then determine a subframe to use for a paging occasion. The base station may make this determination based at least in part on whether a particular subframe is available, and whether the subframe has previously been selected for a paging occasion. These techniques may increase overall paging capacity and decrease the number of collisions between UEs attempting to decode paging signals.

In some circumstances it may be beneficial to repeat paging messages in a control channel over time to increase the probability of successful receipt of the paging messages by an intended recipient UE. Thus, a paging occasion for a UE may include multiple subframes of the control channel, including paging messages repeated according to a repetition level. In some cases, a subframe configured to carry paging messages for a UE may be referred to as a paging subframe. Furthermore, different UEs may have different sets of paging subframes. However, in some examples of paging for MTC devices, ambiguity may be introduced by the presence of multiple UEs with overlapping paging occasions attempting to receive paging messages during one or more paging subframes. For example, paging occasions for different UEs may have different starting subframes but overlap for at least a portion of the paging occasions. According to described aspects, a base station may process paging messages to be transmitted in a paging occasion, based in part on a starting subframe of the paging occasion. The base station may then transmit the paging messages according to the repetition level. In some cases, the paging messages may be scrambled by the base station with a scrambling sequence that is determined based at least on the starting subframe.

A UE may receive one or more paging messages from a base station on a paging occasion of control channel (e.g., an NB control channel used for MTC communication). The UE may then process the one or more paging messages based on a starting subframe of a paging occasion. For example, the UE may initialize a descrambling sequence to use to process the one or more paging messages based on a starting subframe of a paging occasion. The descrambling sequence may correspond to the scrambling sequence that the base station used to scramble the repeating paging message. The UE may then decode the one or more paging messages using the descrambling sequence. Additionally or alternatively, the UE may receive an indication of the starting subframe in a downlink control information (DCI) signal. In some cases, a UE may determine a paging-radio network temporary identifier (P-RNTI) used for the paging messages, where the P-RNTI is associated with the identified starting subframe. For example, the P-RNTI may be used to descramble a cyclic redundancy check (CRC) value for the one or more paging messages.

These techniques may reduce ambiguities in a paging message sent to a first UE such that a second UE checking for a paging message during a portion of the paging occasion may not successfully decode the paging messages. Thus, the second UE, after not successfully decoding the paging messages, may go back to sleep (e.g., return to a sleep or DRX state), thus saving power and resources.

Aspects of the disclosure are initially described in the context of a wireless communication system. Aspects of the disclosure are further illustrated by and described with reference to apparatus diagrams, system diagrams, and flowcharts that relate to paging for MTC devices.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

In a wireless communication system using MTC, a base station may signal to a UE that paging and/or system information is available in a channel for one or more of the UEs of the wireless communication system. The UEs may be low-cost or low-complexity MTC devices (e.g., including an IoT device, M2M communications device, etc.). These UEs may communicate in a narrow subband, or narrowband regions, of a system bandwidth of a wireless communications system (e.g., a subband dedicated for NB-IoT communications). The base stations using MTC may process paging messages for a UE of the one or more UEs.

The base station may communicate with the one or more UEs according to different operating modes. For example, in a stand-alone operation mode, one or more carriers of a radio frequency (RF) spectrum previously used by another radio access technology (e.g., a GSM EDGE radio access network (GERAN)) may be used for MTC. In a guard band operation mode, unused resource blocks within a LTE/LTE-A/NR carrier's guard-band may be used for MTC. In an in-band operation mode, resource blocks within an LTE/LTE-A/NR carrier may be used for MTC. In some cases, when communicating in a narrow subband, some or all of the subframes may have been previously allocated for certain control and/or data, for example, an in-band mode of operation. Depending on the mode of operation, greater or fewer numbers of subframes may be available to the base station for paging operations. A base station that is communicating with one or more UEs may select one or more subframes to use for paging based at least in part on the mode of operation. This may increase overall paging capacity and decrease the number of collisions between UEs attempting to decode paging signals.

In one example, for an in-band mode of operation, the number of subframes available for paging may be limited, for example to a single subframe of a radio frame. In one example of a subframe configuration for an in-band mode of operation for an NB-IoT communication, there may be 10 subframes in a single radio frame, each having a subframe index. The first subframe may be allocated to a physical broadcast channel (e.g., a NB physical broadcast channel (NB-PBCH)), the sixth and tenth subframes may be allocated to synchronization signals (e.g. a NB primary synchronization signal (NB-PSS) and NB secondary synchronization signal (NB-SSS), and the second, third, fourth, seventh, eighth, and ninth subframes may be allocated to MBSFN subframes. Thus, the single subframe may be the fifth subframe of the radio frame.

For a standalone mode of operation or a guard band mode of operation, more than one subframe may be available for paging within a radio frame. Thus, determining paging occasions may be based on the determined mode of operation for the wireless communication system.

In another example, certain legacy MBSFN subframes can be used for paging. In certain examples, a base station may determine that a subframe is valid for downlink (e.g., based on an evaluation of one or more NB reference signals). The subframe may or may not have a cell-specific reference signal (CRS) depending on the MBSFN configuration for the radio frame including the subframe. The base station may determine paging occasions for a radio frame (e.g. the number of paging occasions and/or the paging occasion configuration), and based on the determined paging occasions, set the MBSFN configuration. In some examples, the paging configuration may override the MBSFN configuration.

In yet another example, the MBSFN subframes and the number of paging occasions per subframe may be signaled separately. The base station may broadcast the number of paging occasions per radio frame. The paging configuration may be determined from a number of paging occasions and the MBSFN subframes. Table 1 below illustrates a number of entries with multiple options, where the base stations picks the first subframe that has not been picked before (e.g. there is a subframe number (SF#) already with that subframe), and is also not an MBSFN subframe. Table 1 shows the subframes that are available for MBSFN configuration (subframes 1/2/3/6/7/8). According to Table 1, if a number of paging occasions is indicated to be 1, then the fifth subframe is used for a paging occasion. In this example, subframes 1 and 3 are allocated to be MBSFN subframes according to a MBSFN configuration, out of the possible subframes 1/2/3/6/7/8. Where the number of paging occasions is indicated to be 2, the first subframe (SF#0) for paging is subframe 5 and the second subframe (SF#1) for paging is subframe 2, where subframe 1 has been skipped because of the MBSFN configuration. Where the number of paging occasions is indicated to be 3, the first subframe (SF#0) for paging is subframe 5, the second subframe (SF#1) for paging is subframe 2, the third subframe (SF#2) for paging is subframe 6, where subframes 1 and 3 have been skipped for paging because of the MBSFN configuration. In some examples, the contents of Table 1 may be predetermined, and available at both the base station and UEs to determine the paging configurations.

TABLE 1

| Number of Paging Occasions | SF#0 | SF#1 | SF#2 | SF#3 |
|---|---|---|---|---|
| 1 | 5 | — | — | — |
| 2 | 5 | 2 (selected from 1/2/3/6/7/8) | — | — |
| 3 | 5 | 2 (selected from 1/2/3/6/7/8) | 6 (selected from 1/2/3/6/7/8) | — |
| 4 | 5 | 2 (selected from 1/2/3/6/7/8) | 6 (selected from 1/2/3/6/7/8) | 7 (selected from 1/2/3/6/7/8) |

In some circumstances it may be beneficial to repeat a control channel over time to increase the probability of successful receipt of the paging message by a first intended recipient UE. In some examples of paging for MTC devices, ambiguity may be introduced by the presence of multiple UEs attempting to receive paging messages during a paging occasion. Techniques described below to scramble a repeated paging message may reduce ambiguities such that a second recipient UE that may check for a paging message during a paging occasion may not successfully decode a paging message that has been repeated, but is intended for the first recipient UE. Thus, the second recipient UE, after not successfully decoding the paging message may go back to sleep (e.g., return to an asleep or low-power state), saving power and resources.

As further discussed below with reference to FIG. 2, a paging message sent from a base station for a first UE may be repeated over a series of subframes, for example the repetition level may be 32 or 256 subframes of an MPDCCH. In some examples a single narrowband is available for paging, such that paging for a second UE or a third UE may also be transmitted in the same narrowband. However, multiple narrowbands may also be used in other examples. The base station may transmit the paging message, and repeat it according to the repetition level. In some cases, the paging occasion for the first UE may fall at a different time and/or may not overlap with the paging occasions for other UEs. However, in some cases the paging occasion (e.g., with MPDCCH repetition) may overlap in time with the paging occasion for the at least on other UE. As a result, the other UE may successfully decode at least one instance of the paging message from the MPDCCH correctly, and think that there is paging information awaiting the other UE based on the paging message. In some systems, a large number of UEs may be monitoring paging. For example, there may be four subframes used for paging occasions per radio frame, and each paging occasion may use an MPDCCH repetition level of 256. As a result, up to 100× the number of UEs may end up waking up for paging information that is not for them due to this false decoding, where only 1× actually need to read the corresponding PDSCH for paging information. In other words, each UE may wake up or stay awake (e.g., staying out of a DRX state) to read paging information up to 100× as often as necessary. This additional awake time may have a substantial impact on power consumption for UEs monitoring paging.

According to various aspects, paging messages may be processed based at least in part on a starting subframe prior to transmission to avoid false decodings. For example, a scrambling sequence may be initialized and applied to the paging message on a per subframe basis, where the scrambling sequence depends on a starting subframe for the paging occasion. Eq. 1 below is such a scrambling sequence. The starting subframe is represented by $i_0$, the absolute subframe number of the first downlink subframe intended for the paging occasion (e.g., a subframe of an MPDCCH). In some examples, the $f(i_0)=i_0$. That is, the value of $f(i_0)$ is the starting subframe number associated with the paging occasion. Scrambling according to the scrambling sequence may be applied to a demodulation reference signal (DM-RS), data, or both.

$$c_{init}=[(j_0+j)N_{acc} \bmod_{10}] \cdot 2^9 + N_{ID}^{cell} + f(i_0) \quad (1)$$

In some examples, Eq. 1 may be simplified for paging, such that $j_0=0$ and j is the subframe number which may cycle from 0 to 9 for a radio frame. In such cases, Eq. 1 may simplify to Eq. 2 as follows:

$$c_{init}=[sf] \cdot 2^9 + N_{ID}^{cell} + f(i_0) \quad (2)$$

Portions or all of the paging message may be scrambled to avoid false decodings by unintended recipient UEs according to various mechanisms. For example, a downlink control channel portion may be scrambled, uncoded bits may be scrambled, different interleavers may be applied to the paging message, or different phase shifts may be applied to IQ samples.

In other examples, the scrambling value for the paging message may be constant across repetitions (e.g., the subframe (sf) value in Eq. 2 is fixed), or the scrambling can be performed based on some higher layer UE parameter. The higher layer parameter may be common among UEs that share the same paging occasion, or different groups inside the same paging occasion may have different parameters.

Additionally or alternatively, the paging messages may indicate the starting subframe of the paging occasion. For example, the DCI of the control channel used for the paging messages may carry an explicit indicator of the starting subframe. The explicit indicator may be, for example, a subset of bits of a subframe number. For example, where a maximum repetition level is N, at least a subset of the subframe number (e.g., all bits of the subframe number, the log 2(N) or 1+log 2(N) least significant bits of the subframe number) of the starting subframe may be included in the DCI of the paging messages.

In some cases, a P-RNTI value that corresponds to a starting subframe number may be used as an implicit indicator of the starting subframe number. For example, a base station and UE may each have a function or table that corresponds one of multiple P-RNTI values with a starting subframe for a paging occasion. The base station and UE may determine the P-RNTI value (which in some cases is also used for other purposes), and determine the starting subframe for the paging occasion from the determined P-RNTI. Alternatively, the base station and UE may determine the P-RNTI from the starting subframe or another UE-specific identifier (e.g., UE-ID, etc.). In some cases, there may be a one-to-one mapping of starting subframes for paging occasions and RNTI values. In other cases, there may be fewer P-RNTI values than potential starting subframes (e.g., the number of bits used to specify the subframe number may define a greater range than the P-RNTI values). For example, the number of different P-RNTI values used may be equal to the maximum repetition level, or less than the maximum repetition level, in some cases.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Some types of wireless devices may provide for automated communication. Automated wireless devices may include those implementing M2M communication or MTC. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical (PHY) access control, and transaction-based business charging. An MTC device may operate using half-duplex (one-way) communications at a reduced peak rate. MTC devices may also be configured to enter a power saving "deep sleep" mode when not engaging in active communications.

In some cases, a UE 115 may enter an idle mode and periodically wake up to receive paging messages. In some cases, each UE 115 within the wireless communication system 100 may be assigned a P-RNTI (e.g., the same P-RNTI or different, UE-specific P-RNTIs). If the serving gateway (S-GW) receives data for the UE 115, it may notify the mobility management entity (MME), which may send a paging message to every base station 105 within an area known as a tracking area. Each base station 105 within the tracking area may send a paging message with the P-RNTI. Thus, the UE may remain idle without updating the MME until it leaves the tracking area.

Figure 2:
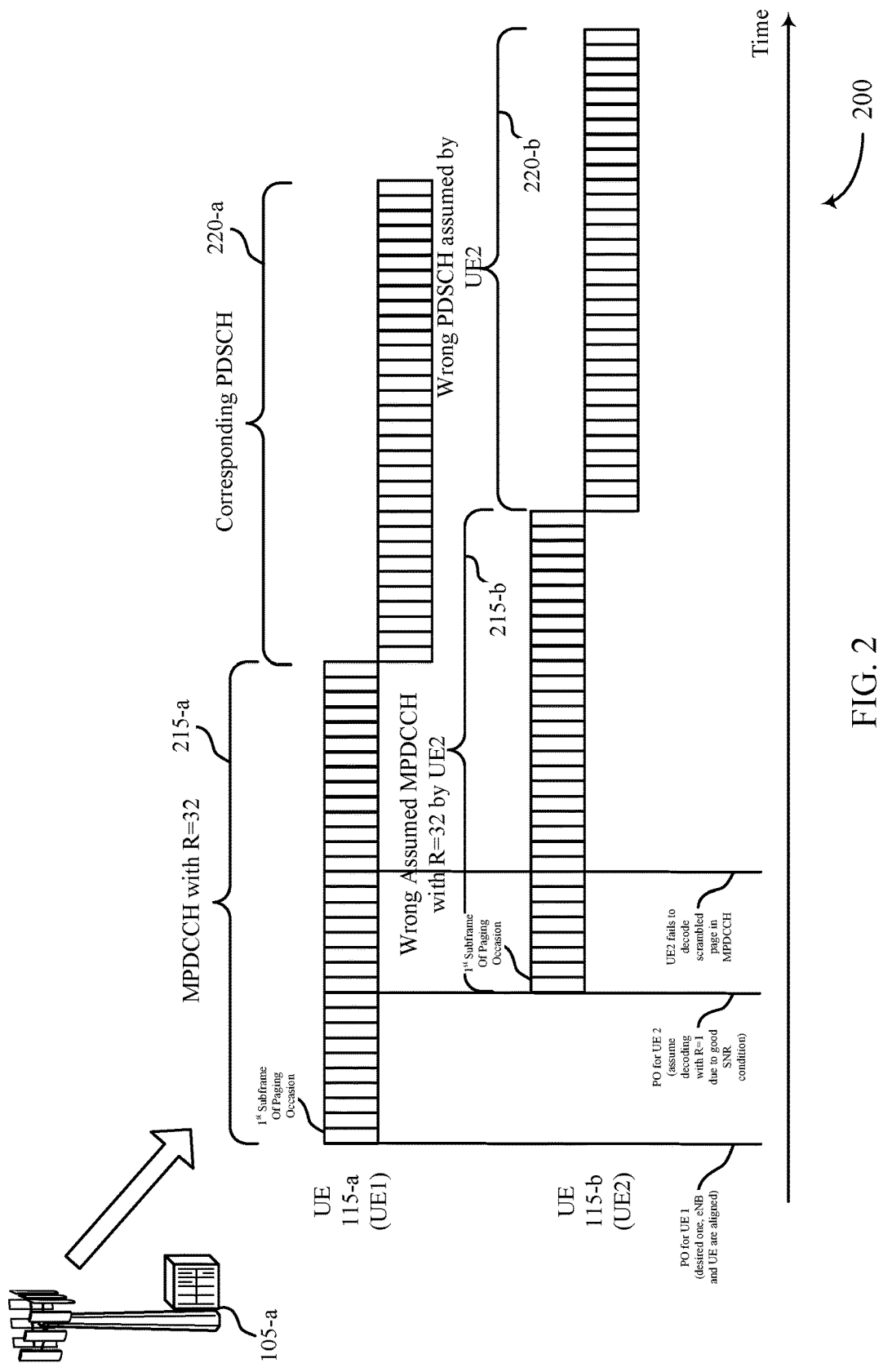
FIG. 2 illustrates an example of a process that supports paging for MTC devices in accordance with aspects of the present disclosure.

FIG. 2 illustrates an example of a process 200 for paging for MTC devices in accordance with various aspects of the present disclosure. Process 200 may include base station 105-*a* and UE 115-*a* and UE 115-*b*, which may be examples of the corresponding devices described with reference to FIG. 1. In process 200, UE 115-*a* monitors a control channel (e.g., a MPDCCH) during paging occasion 215-*a* while UE 115-*b* monitors the control channel during paging occasion 215-*b*. Base station 105-*a* may transmit paging messages to UE 115-*a* using paging occasion 215-*a* (e.g., an MPDCCH including a paging message with a repetition level of R=32 subframes), with a corresponding PDSCH 220-*a* to follow. If the repeating paging messages overlap with the paging occasion 215-*b* of UE 115-*b*, UE 115-*b* may falsely decode one or more of the paging messages, as further described above with reference to FIG. 1. In that case, UE 115-*b* may wrongly assume that there will be control information on PDSCH 220-*b* as shown in FIG. 2. However, the repeated page or paging messages in paging occasion 215-*a* may be scrambled by base station 105-*a* as discussed above using Eq. 1 and/or Eq. 2. The scrambling sequence for the paging message may be based on the number of prior repetitions of the paging message or the starting subframe for the paging occasion, or a combination thereof. While UE 115-*b* may attempt to decode the scrambled paging messages, for example beginning at the first subframe of its paging occasion 215-*b*, UE 115-*b* may fail to decode the paging messages within paging occasion 215-*a* and return to sleep (e.g., a DRX state or low-power mode) at the end of paging occasion 215-*b*, without proceeding to attempt to decode the PDSCH 220-*b* that would have been associated with its paging occasion 215-*b* (e.g., shown in FIG. 2 as being eight subframes after the PDSCH 220-*a* for UE 115-*a*).

As also described above, the first subframe number associated with the paging occasion 215-*a* for UE 115-*a* may also be indicated explicitly in DCI of the paging messages carried in the paging occasion 215-*a*, or implicitly via a P-RNTI associated with the first subframe number of the paging occasion 215-*a*. For example, each paging message for the paging occasion 215-*a* may have a field in the DCI that indicates at least a subset of bits of the starting subframe number of the paging occasion 215-*a*. Alternatively, the first subframe number associated with the paging occasion 215-*a* for UE 115-*a* may be signaled implicitly using a P-RNTI that is associated with the starting subframe number of the paging occasion 215-*a*. For example, paging messages sent in paging occasion 215-*a* may have a CRC field scrambled with a first P-RNTI value associated with the first subframe of paging occasion 215-*a* while paging messages sent in paging occasion 215-*b* may have the CRC field scrambled with a second P-RNTI value associated with the first subframe of paging occasion 215-*b*. Thus, UE 115-*b* would not successfully decode the DCI of paging messages in paging occasion 215-*a*, while UE 115-*a* would not successfully decode the DCI of paging messages in paging occasion 215-*b*.

Figure 3:
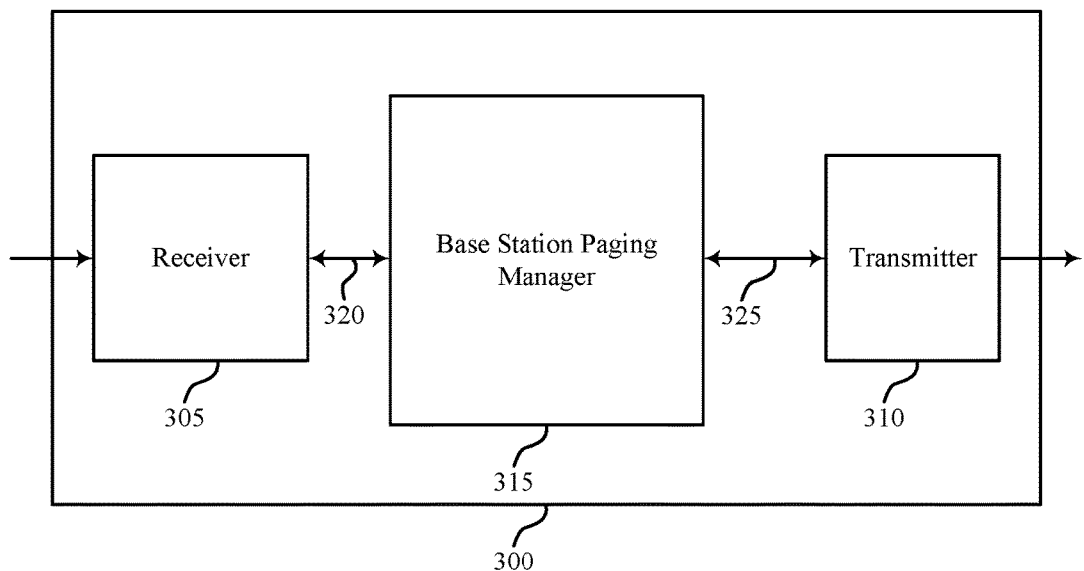
FIGS. 3 through 5 show block diagrams of a wireless device that supports paging for MTC devices in accordance with aspects of the present disclosure.

FIG. 3 shows a block diagram of a wireless device 300 that supports paging for MTC devices in accordance with various aspects of the present disclosure. Wireless device 300 may be an example of aspects of a base station 105 described with reference to FIGS. 1 and 2. Wireless device 300 may include receiver 305, transmitter 310 and base station paging manager 315. Wireless device 300 may also include a processor. Each of these components may be in communication with each other.

The receiver 305 may receive information such as packets, user data, or control information associated with various information channels (e.g., control channels, data channels, and information related to paging for MTC devices, etc.). Information may be passed on to other components of the device via link 320. The receiver 305 may be an example of aspects of the transceiver 625 described with reference to FIG. 6.

The transmitter 310 may transmit signals received from other components of wireless device 300. In some examples, the transmitter 310 may be collocated with a receiver in a transceiver module. For example, the transmitter 310 may be an example of aspects of the transceiver 625 described with reference to FIG. 6. The transmitter 310 may include a single antenna, or it may include a plurality of antennas.

The base station paging manager 315 may identify, at the base station, a mode of operation for MTC, and determine, based on the identified mode of operation, at least one subframe of a radio frame to be used for a paging occasion for a UE with which the base station communicates using MTC. The base station paging manager 315 may also be an example of aspects of the base station paging manager 605 described with reference to FIG. 6.

The base station paging manager 315 may also identify a MBSFN subframe configuration for the base station to communicate with one or more UEs, identify a paging configuration in which at least one potential MBSFN subframe is designated as a subframe available for use by the base station to use to page the one or more UEs, and determine the paging occasion for a subframe of the radio frame based on the identified paging configuration.

The base station paging manager 315 may also identify a starting subframe and a repetition level for a paging occasion, where the paging occasion is used by the base station to page one or more UEs (e.g., via a NB control channel used for MTC communication), process paging messages for the one or more UEs based at least in part on the starting subframe, and transmit or forward the paging messages to transmitter 310 via link 325, based at least on the repetition level.

Figure 4:
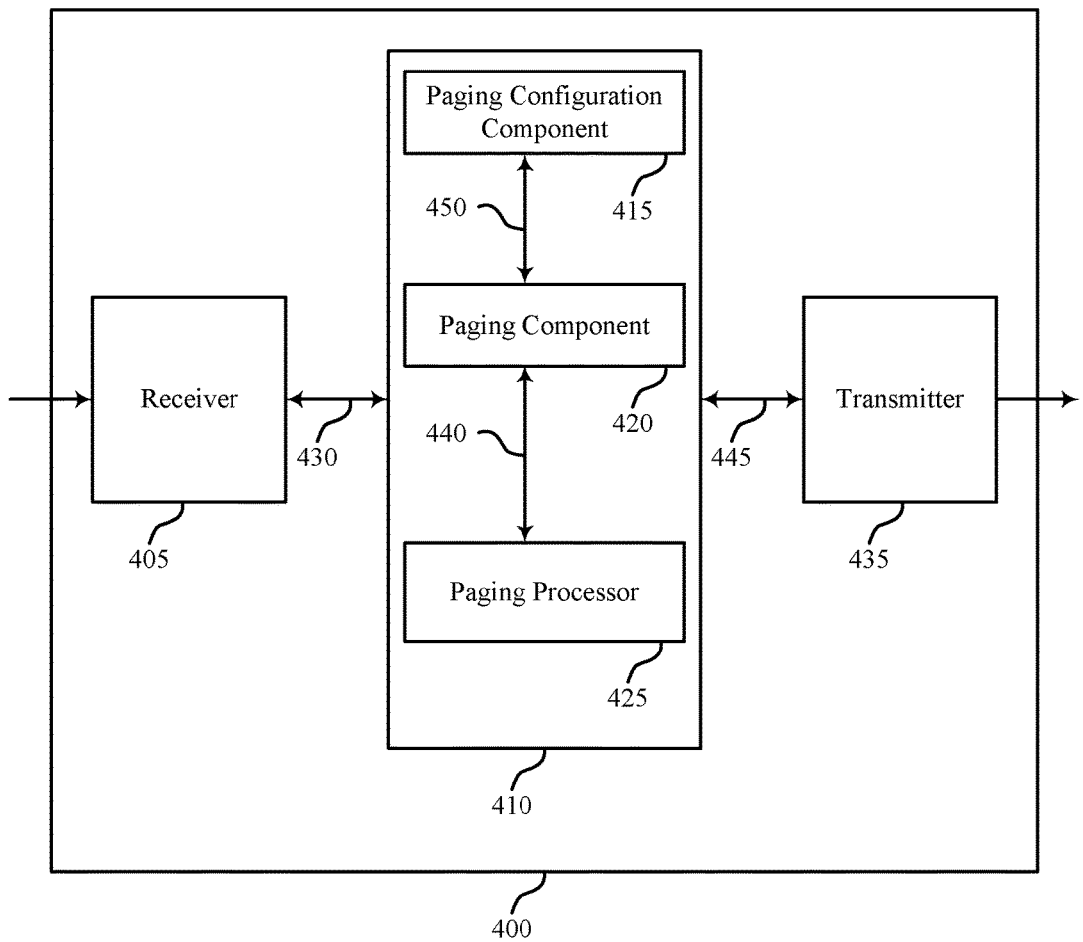

FIG. 4 shows a block diagram of a wireless device 400 that supports paging for MTC devices in accordance with various aspects of the present disclosure. Wireless device 400 may be an example of aspects of a wireless device 300 or a base station 105 described with reference to FIGS. 1, 2 and 3. Wireless device 400 may include receiver 405, base station paging manager 410 and transmitter 435. Wireless device 400 may also include a processor. Each of these components may be in communication with each other.

The receiver 405 may receive information which may be passed on to other components of the device via link 430. The receiver 405 may also perform the functions described with reference to the receiver 305 of FIG. 3. The receiver 405 may be an example of aspects of the transceiver 625 described with reference to FIG. 6.

The base station paging manager 410 may be an example of aspects of base station paging manager 315 described with reference to FIG. 3. The base station paging manager 410 may include paging configuration component 415, paging component 420, and paging processor 425. In some cases, the base station paging manager 410 may be in communication with receiver 405 and transmitter 435 via link 430 and link 445, respectively. The base station paging manager 410 may be an example of aspects of the base station paging manager 605 described with reference to FIG. 6.

The paging configuration component 415 may configure one or more UEs to monitor paging messages. In some cases, the paging configuration component 415 may be in communication with the paging component via link 450.

The paging component 420 may identify a paging configuration in which at least one potential MBSFN subframe is designated as a subframe available for use by the base station to use to page the one or more UEs, determine the paging occasion for a subframe of the radio frame based on the identified paging configuration, and determine the paging occasion for the subframe based on the identified paging information and the determination whether the available subframe has previously been selected for the prior paging occasion.

The paging component 420 may also identify a starting subframe and a repetition level for a paging occasion, where the paging occasion is used by the base station to page one or more UEs. In some other cases, paging component 420 may forward one or more paging messages generated by paging processor 425 to the transmitter 435 via link 445. Paging processor 425 and paging component 420 may be in communication via link 440. Transmitter 435 may transmit the one or more generated paging messages according to the repetition level.

In some cases, the identified paging configuration includes a number of paging occasions per radio frame. In some cases, determining the paging occasion for the subframe is based on the identified paging configuration and the MBSFN subframe configuration. In some cases, the starting subframe is a starting subframe number. In some cases, a DCI signal is generated, corresponding to the one or more paging messages. In some cases, transmitting the paging messages includes transmitting to the UEs, an indication of the starting subframe in the DCI signal. In some cases, the radio frame has only one subframe available for paging occasions if the identified mode of operation is an in-band mode. In some cases, the radio frame has a set of subframes available for paging occasions if the identified mode of operation is a stand-alone mode or a guard band mode. In some examples, the paging configuration includes a P-RNTI that is determined based on the paging occasion or other UE-specific information (e.g., UE-ID, etc.). The P-RNTI may be one of multiple different P-RNTI values using for paging different UEs. In some examples, the starting subframe may be determined based on the P-RNTI value.

The paging processor 425 may process one or more paging messages for a UE of the one or more UEs based in part on the starting subframe. In some cases, processing the paging messages may include scrambling the one or more paging messages with a scrambling sequence, which is based on prior repetitions of a paging message or the starting subframe for a paging occasion. In some cases, the one or more paging messages may comprise a portion of a DL control channel (e.g., an MPDCCH, etc.). In some cases, processing the one or more paging messages includes scrambling a portion (e.g., a CRC field) of the one or more paging messages with the P-RNTI determined by the paging configuration component 415.

The transmitter 435 may transmit signals received from other components of wireless device 400. In some examples, the transmitter 435 may be collocated with a receiver in a transceiver module. For example, the transmitter 435 may be an example of aspects of the transceiver 625 described with reference to FIG. 6. The transmitter 435 may utilize a single antenna, or it may utilize a plurality of antennas.

Figure 5:
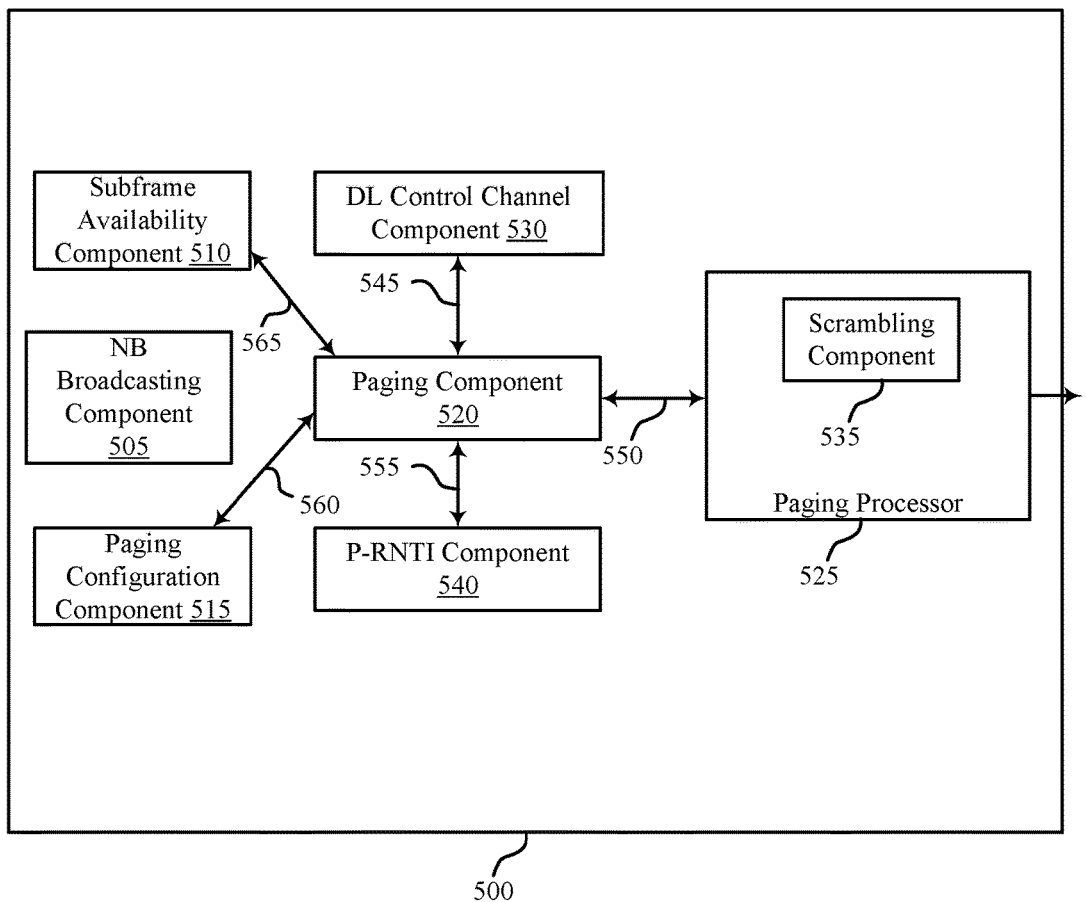

FIG. 5 shows a block diagram of a base station paging manager 500 which may be an example of the corresponding component of wireless device 300 or wireless device 400. That is, base station paging manager 500 may be an example of aspects of base station paging manager 315 or base station paging manager 410 described with reference to FIGS. 3 and 4. The base station paging manager 500 may also be an example of aspects of the base station paging manager 605 described with reference to FIG. 6.

The base station paging manager 500 may include NB broadcasting component 505, paging configuration component 515, subframe availability component 510, DL control channel component 530, paging component 520, paging processor 525, scrambling component 535, and P-RNTI component 540. Each of these modules may communicate, directly or indirectly, with one another (e.g., via one or more buses or communication links).

The NB broadcasting component 505 may broadcast the paging information over a NB-PDSCH. Paging configuration component 515 may be an example of paging configuration component 415 described with reference to FIG. 4. In some cases, the paging configuration component 515 may configure one or more UEs to monitor paging messages.

The subframe availability component 510 may determine whether an available subframe has previously been selected for a prior paging occasion. In some cases, determining the paging occasion includes determining an available subframe of the radio frame. In some cases, the subframe availability component 510 may pass on information pertaining to an available subframe 565 to the paging component 520.

The DL control channel component 530 may generate a downlink control channel scrambled based on the scrambling sequence. In some other cases, DL control channel component 530 may forward a downlink control channel scrambled based on the scrambling sequence to paging component 520 via link 545.

The paging processor 525, which may be an example of the paging processor 425 described with reference to FIG. 4, may process one or more paging messages 550 received from paging component 520 for a UE of the one or more UEs. In some cases, paging processor 525 may additionally comprise scrambling component 535, which may perform scrambling operations. In some cases, processing the paging messages 550 may be based in part on the starting subframe. In some cases, processing the paging messages 550 may include scrambling the paging messages 550 with a scrambling sequence, which is based on prior repetitions of a paging message or the starting subframe for a paging occasion.

The paging component 520 may identify paging configurations 560 configured for UEs by paging configuration component 515. Paging component 520 may identify a paging configuration 560 in which at least one potential MBSFN subframe is designated as a subframe available for use by the base station to use to page the one or more UEs, determine the paging occasion for a subframe of the radio frame based on the identified paging configuration, and determine the paging occasion for the subframe based on the identified paging information. Furthermore, in some cases the paging component 520 may determine whether the available subframe 565 has previously been selected for the prior paging occasion.

The paging component 520 may also identify a starting subframe and a repetition level for a paging occasion, where the paging occasion is used by the base station to page one or more UEs using MTC, and forward paging messages 550 for a UE of the one or more UEs to paging processor 525. In some cases, paging processor 525 may subsequently forward the paging messages to a transmitter for transmission, the paging messages transmitted according to the repetition level. In some cases, paging component 520 may determine, based on the identified mode of operation, at least one subframe of a radio frame to be used for a paging occasion for a UE with which the base station communicates using MTC.

The P-RNTI component 540 may determine a P-RNTI 555 associated with the identified starting subframe. The determined P-RNTI 555 may be passed on to the paging component 520. In some cases, processing the one or more paging messages includes scrambling a portion (e.g., a CRC field) of the one or more paging messages with the determined P-RNTI 555.

Figure 6:
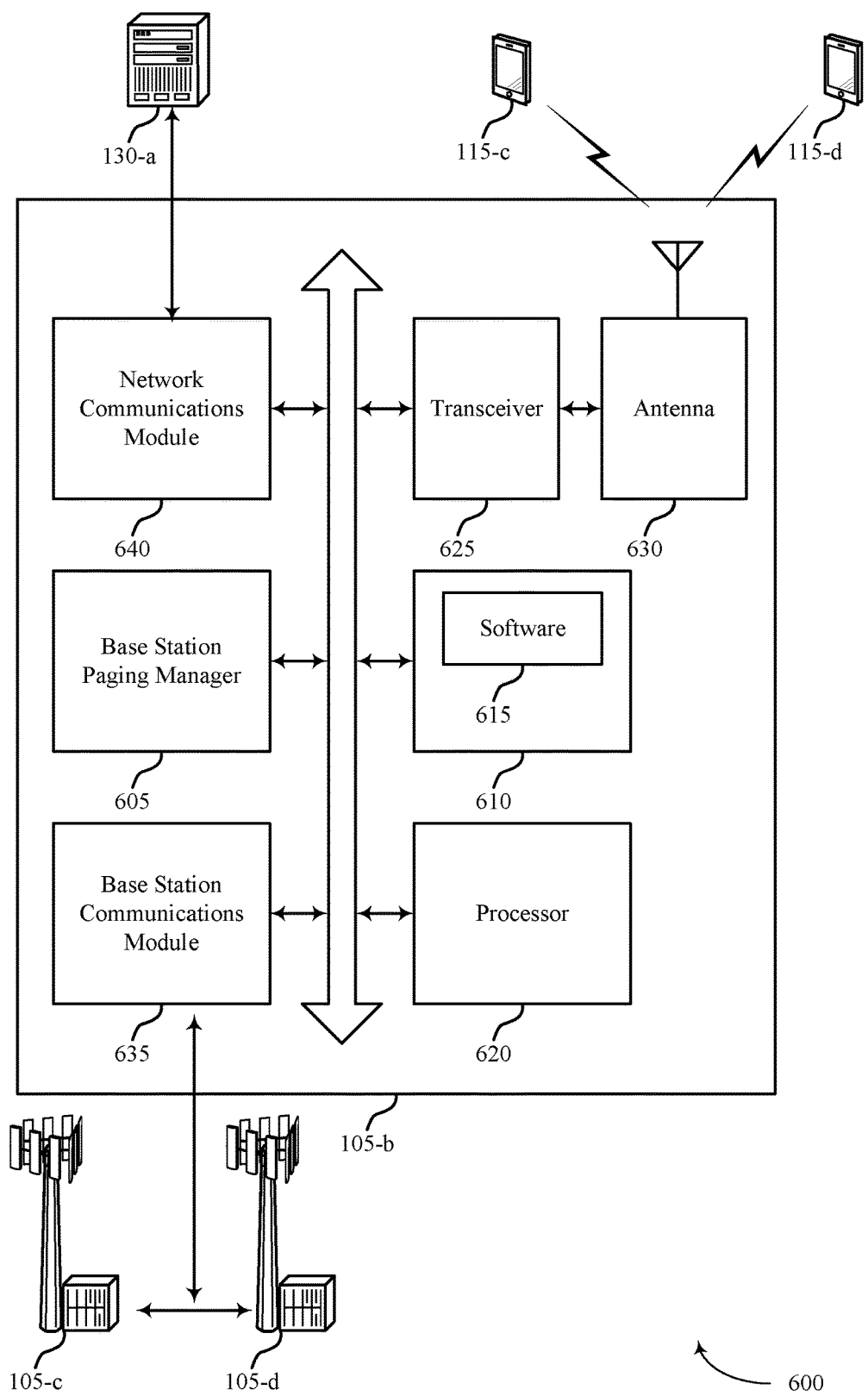
FIG. 6 illustrates a block diagram of a system including a base station that supports paging for MTC devices in accordance with aspects of the present disclosure.

FIG. 6 shows a diagram of a wireless system 600 including a device configured that supports paging for MTC devices in accordance with various aspects of the present disclosure. For example, wireless system 600 may include base station 105-b, which may be an example of a wireless device 300, a wireless device 400, or a base station 105 as described with reference to FIGS. 1, 2 and 3 through 5. Base station 105-b may also include components for bi-directional voice and data communications including components for transmitting communications and components for receiving communications. For example, base station 105-b may communicate bi-directionally with one or more UEs 115.

Base station 105-b may also include base station paging manager 605, memory 610, processor 620, transceiver 625, antenna 630, base station communications module 635 and network communications module 640. Each of these modules may communicate, directly or indirectly, with one another (e.g., via one or more buses). The base station paging manager 605 may be an example of a base station paging manager as described with reference to FIGS. 3 through 5.

The memory 610 may include random access memory (RAM) and read only memory (ROM). The memory 610 may store computer-readable, computer-executable software including instructions that, when executed, cause the processor to perform various functions described herein (e.g., paging for MTC devices, etc.). In some cases, the software 615 may not be directly executable by the processor but may cause a computer (e.g., when compiled and executed) to perform functions described herein. The processor 620 may include an intelligent hardware device, (e.g., a central processing unit (CPU), a microcontroller, an application specific integrated circuit (ASIC), etc.)

The transceiver 625 may communicate bi-directionally, via one or more antennas, wired, or wireless links, with one or more networks, as described above. For example, the transceiver 625 may communicate bi-directionally with a base station 105 or a UE 115. The transceiver 625 may also include a modem to modulate the packets and provide the modulated packets to the antennas for transmission, and to demodulate packets received from the antennas. In some cases, the wireless device may include a single antenna 630. However, in some cases the device may have more than one antenna 630, which may be capable of concurrently transmitting or receiving multiple wireless transmissions.

The base station communications module 635 may manage communications with other base station 105, and may include a controller or scheduler for controlling communications with UEs 115 in cooperation with other base stations 105. For example, the base station communications module 635 may coordinate scheduling for transmissions to UEs 115 for various interference mitigation techniques such as beamforming or joint transmission. In some examples, base station communications module 635 may provide a X2 interface within a LTE/LTE-A wireless communication network technology to provide communication between base stations 105.

The network communications module 640 may manage communications with the core network (e.g., via one or more wired backhaul links). For example, the network communications module 640 may manage the transfer of data communications for client devices, such as one or more UEs 115.

Figure 7:
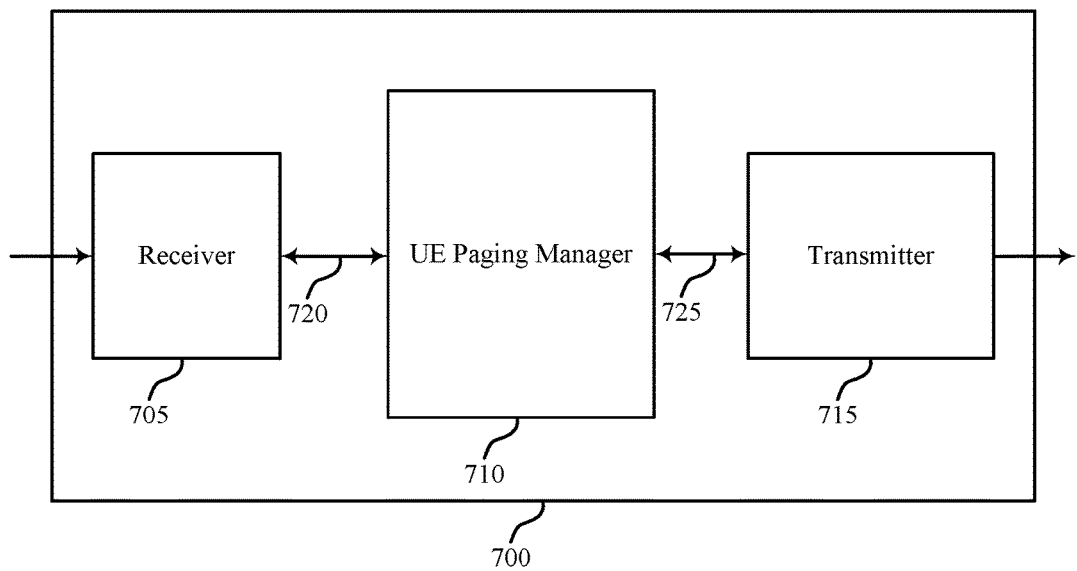
FIGS. 7 through 9 show block diagrams of a wireless device that supports paging for MTC devices in accordance with aspects of the present disclosure.

FIG. 7 shows a block diagram of a wireless device 700 that supports paging for MTC devices in accordance with various aspects of the present disclosure. Wireless device 700 may be an example of aspects of a UE 115 described with reference to FIGS. 1 and 2. Wireless device 700 may include receiver 705, transmitter 710 and UE paging manager 715. Wireless device 700 may also include a processor. Each of these components may be in communication with each other.

The receiver 705 may receive information such as packets, user data, or control information associated with various information channels (e.g., control channels, data channels, and information related to paging for MTC devices, etc.). Information may be passed on to other components of the device, for example, via link 720. The receiver 705 may be an example of aspects of the transceiver 1025 described with reference to FIG. 10.

The transmitter 710 may transmit signals received from other components of wireless device 700. In some cases, the transmitter 710 may be in communication with UE paging manager 715 via link 725. In some examples, the transmitter 710 may be collocated with a receiver in a transceiver module. For example, the transmitter 710 may be an example of aspects of the transceiver 1025 described with reference to FIG. 10. The transmitter 710 may include a single antenna, or it may include a plurality of antennas.

The UE paging manager 715 may identify a starting subframe and a repetition level used by a base station to page the UE. The UE paging manager 715 may receive, from a base station 105, one or more paging messages (e.g., via a NB control channel used for MTC communication), and process the one or more paging messages based on a starting subframe. The UE paging manager 715 may also be an example of aspects of the UE paging manager 1005 described with reference to FIG. 10.

Figure 8:
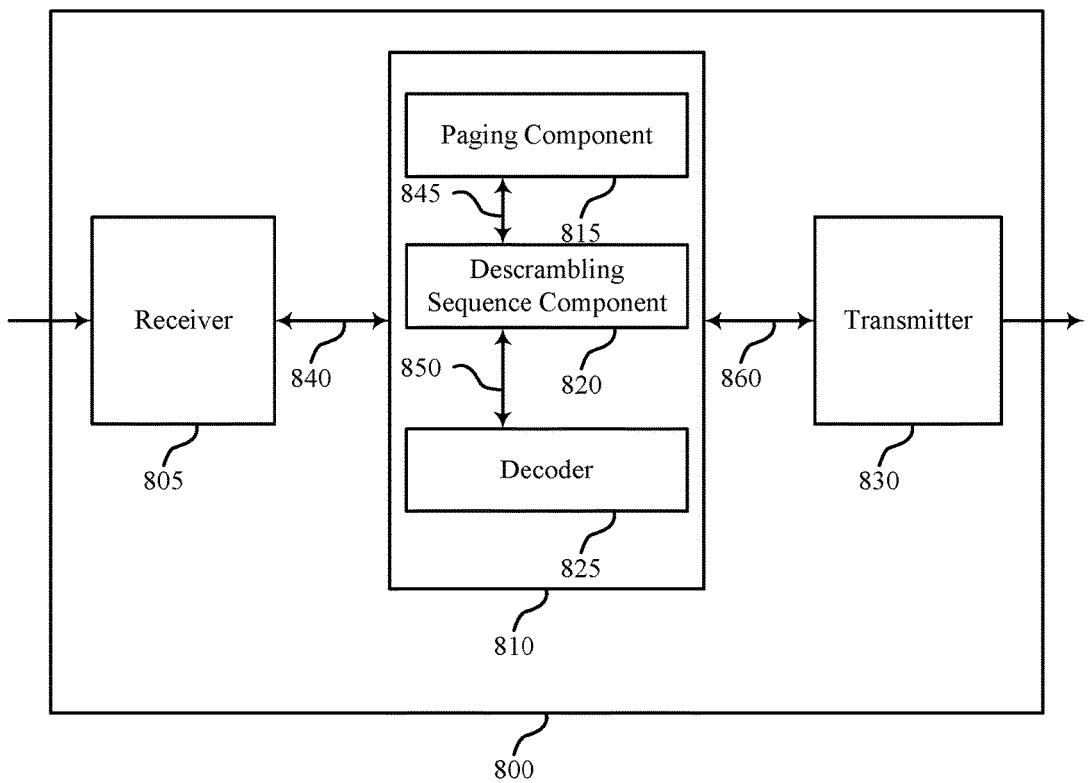

FIG. 8 shows a block diagram of a wireless device 800 that supports paging for MTC devices in accordance with various aspects of the present disclosure. Wireless device 800 may be an example of aspects of a wireless device 700 or a UE 115 described with reference to FIGS. 1, 2 and 7. Wireless device 800 may include receiver 805, UE paging manager 810 and transmitter 830. Wireless device 800 may also include a processor. Each of these components may be in communication with each other.

The receiver 805 may receive information which may be passed on to other components of the device. The receiver 805 may also perform the functions described with reference to the receiver 705 of FIG. 7. The receiver 805 may be an example of aspects of the transceiver 1025 described with reference to FIG. 10.

The UE paging manager 810 may be an example of aspects of UE paging manager 715 described with reference to FIG. 7. The UE paging manager 810 may include paging component 815, descrambling sequence component 820 and decoder 825. In some cases, the UE paging manager 810 may be in communication with the receiver 805, via link 840. The UE paging manager 810 may be an example of aspects of the UE paging manager 1005 described with reference to FIG. 10.

The paging component 815 may identify a starting subframe and a repetition level for a paging occasion, where the paging occasion is used by a base station to page the UE. The paging component 815 may receive, from a base station 105, one or more paging messages 845. In some cases, receiving the one or more paging messages 845 includes receiving a downlink control channel (e.g., PDCCH, NB-PDCCH, MPDCCH, etc.). In some cases, receiving the one or more paging messages 845 includes receiving an indication of the starting subframe in the paging messages 845. For example, the starting subframe may be explicitly indicated in DCI in the paging messages 845, or may be implicitly indicated via use of a P-RNTI that is associated with the starting subframe of the paging occasion. Furthermore, in some cases, the paging component 815 may pass on the one or more paging messages 845, along with an indication of the starting subframe to descrambling sequence component 820 for additional processing.

The descrambling sequence component 820 may initialize a descrambling sequence 850 to process the one or more paging messages 845 based on the starting subframe. For example, the descrambling sequence component 820 may initialize the descrambling sequence 850 based on the starting subframe or a number of prior subframes of the paging occasion (e.g., the expected number of prior repetitions of a paging message). In some cases, the descrambling sequence component 820 may forward the descrambling sequence 850 along with the one or more paging messages 845 to decoder 825.

The decoder 825 may decode the one or more paging messages 845 based on the descrambling sequence 850. For example, the decoder may process the descrambled bits or apply a P-RNTI to a portion (e.g., CRC field, etc.) of the one or more paging messages 845.

The transmitter 830 may transmit signals received from other components of wireless device 800. For example, in some cases, the UE paging manager 810 may be in communication with the transmitter 830, and may forward signals for transmission to the transmitter 830 via link 860. In some examples, the transmitter 830 may be collocated with a receiver in a transceiver module. For example, the transmitter 830 may be an example of aspects of the transceiver 1025 described with reference to FIG. 10. The transmitter 830 may utilize a single antenna, or it may utilize a plurality of antennas.

Figure 9:
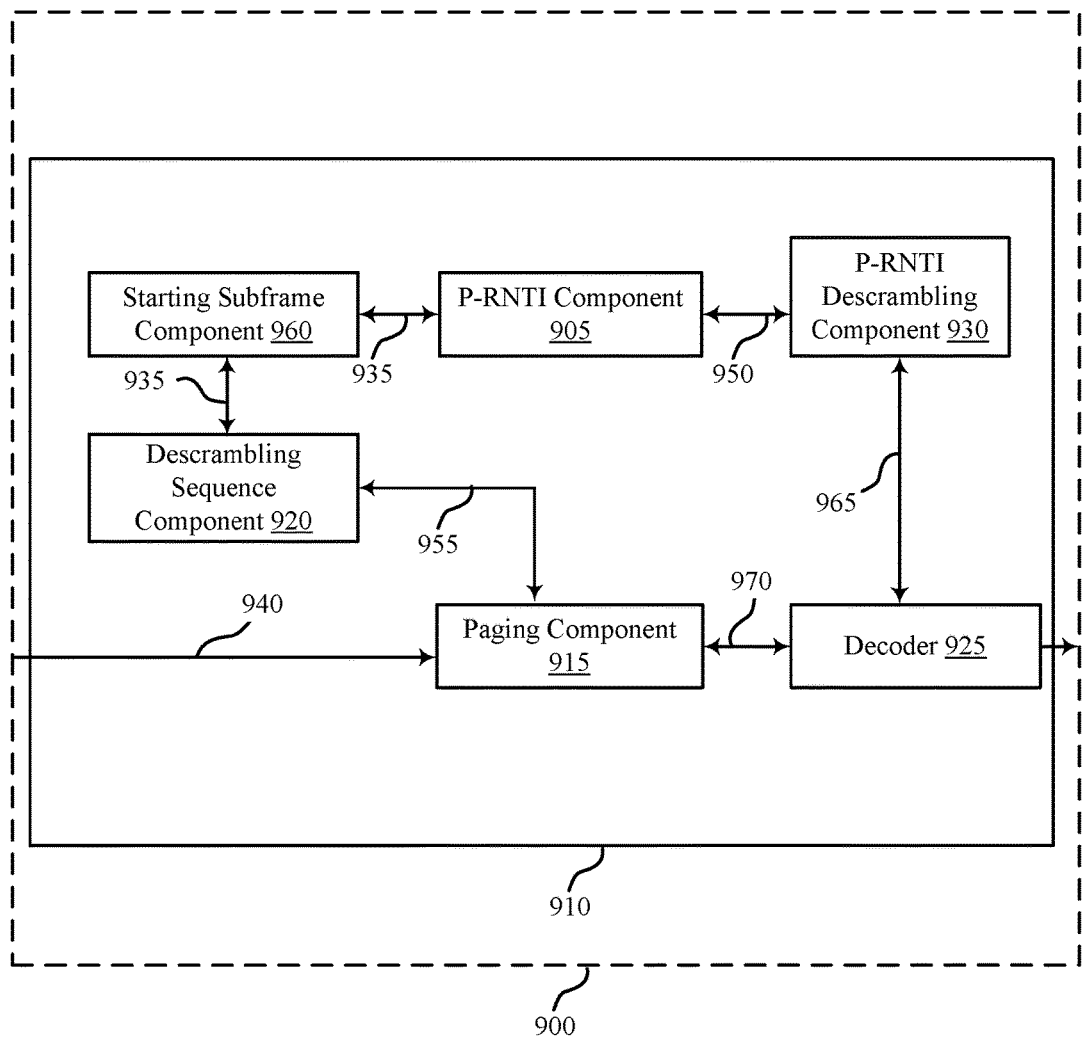

FIG. 9 shows a block diagram of a wireless device 900 that supports paging for MTC devices in accordance with various aspects of the present disclosure. Wireless device 900 may be an example of aspects of wireless device 700, or wireless device 800 or a UE 115 described with reference to FIGS. 1, 2, 7 and 8. Wireless device 900 may include UE paging manager 910. Wireless device 900 may also include a processor (not shown). UE paging manager 910 may be an example of aspects of UE paging manager 710 or UE paging manager 810 described with reference to FIGS. 7 and 8. The UE paging manager 910 may also be an example of aspects of the UE paging manager 1005 described with reference to FIG. 10.

The UE paging manager 910 may include paging component 915, starting subframe component 960, descrambling sequence component 920, decoder 925, P-RNTI component 905, and descrambling component 930. Each of these modules may communicate, directly or indirectly, with one another (e.g., via one or more buses or communication links).

The starting subframe component 960 may identify the starting subframe and a repetition level used by the base station 105 to page the UE 115. The starting subframe component 960 may identify the starting subframe based on an ID of the UE 115 and subframe number information included in, for example, broadcast information from the base station. The starting subframe component 960 may identify the repetition level based on information received from the base station (e.g., in RRC signaling, broadcast signaling, etc.). In some cases, the starting subframe component 960 may be a subcomponent of paging component 915. Furthermore, in some cases, starting subframe component 960 may pass the identified starting subframe 935 to descrambling sequence component 920 and/or P-RNTI component 905.

The P-RNTI component 905 may determine a P-RNTI associated with the identified starting subframe. In some cases, P-RNTI component 905 may receive the identified starting subframe 935 from starting subframe component 960. P-RNTI component 905 may determine a P-RNTI value 950 and pass the determined P-RNTI value 950 to P-RNTI descrambling component 930. In some cases, the P-RNTI descrambling component 930 may descramble a portion of a paging message (e.g., a CRC field) with the determined P-RNTI 950, received from P-RNTI component 905. The P-RNTI descrambling component 930 may pass the descrambled portion of the paging message 965 to the decoder 925.

In some cases, the descrambling sequence component 920 may initialize a descrambling sequence 955 to process the one or more paging messages based on the starting subframe 935 received from starting subframe component 960. The descrambling sequence component 920 may pass the descrambling sequence 955 to the paging component 915.

The paging component 915 may receive, from a base station 105, one or more paging messages 940 (e.g., via a downlink control channel such as a PDCCH, MPDCCH, or NB-PDCCH). The paging component 915 may process the paging messages 940 based on the descrambling sequence 955 received from the descrambling sequence component 920. In some cases, receiving the one or more paging messages 940 includes receiving an indication of the starting subframe in the paging messages. For example, the starting subframe may be explicitly indicated in DCI in the paging messages, or may be implicitly indicated via use of a P-RNTI that is associated with the starting subframe of the paging occasion. The paging component may pass the descrambled paging messages 970 to the decoder 925.

The decoder 925 may decode the descrambled paging messages 970, and may apply the descrambled portion of the paging message 965 (e.g., CRC field) received from the P-RNTI descrambling component 930. The decoder 925 may determine if the descrambled paging messages 970 are intended for the UE 115 employing the UE paging manager 910 (e.g., based on passing CRC, etc.), and send information from the decoded paging message (e.g., DCI, etc.) for further processing. For example, the decoder 925 may indicate to a sleep or DRX state controller of the UE 115 that it should remain awake to process paging information based on successful decoding of the descrambled paging messages 970.

Figure 10:
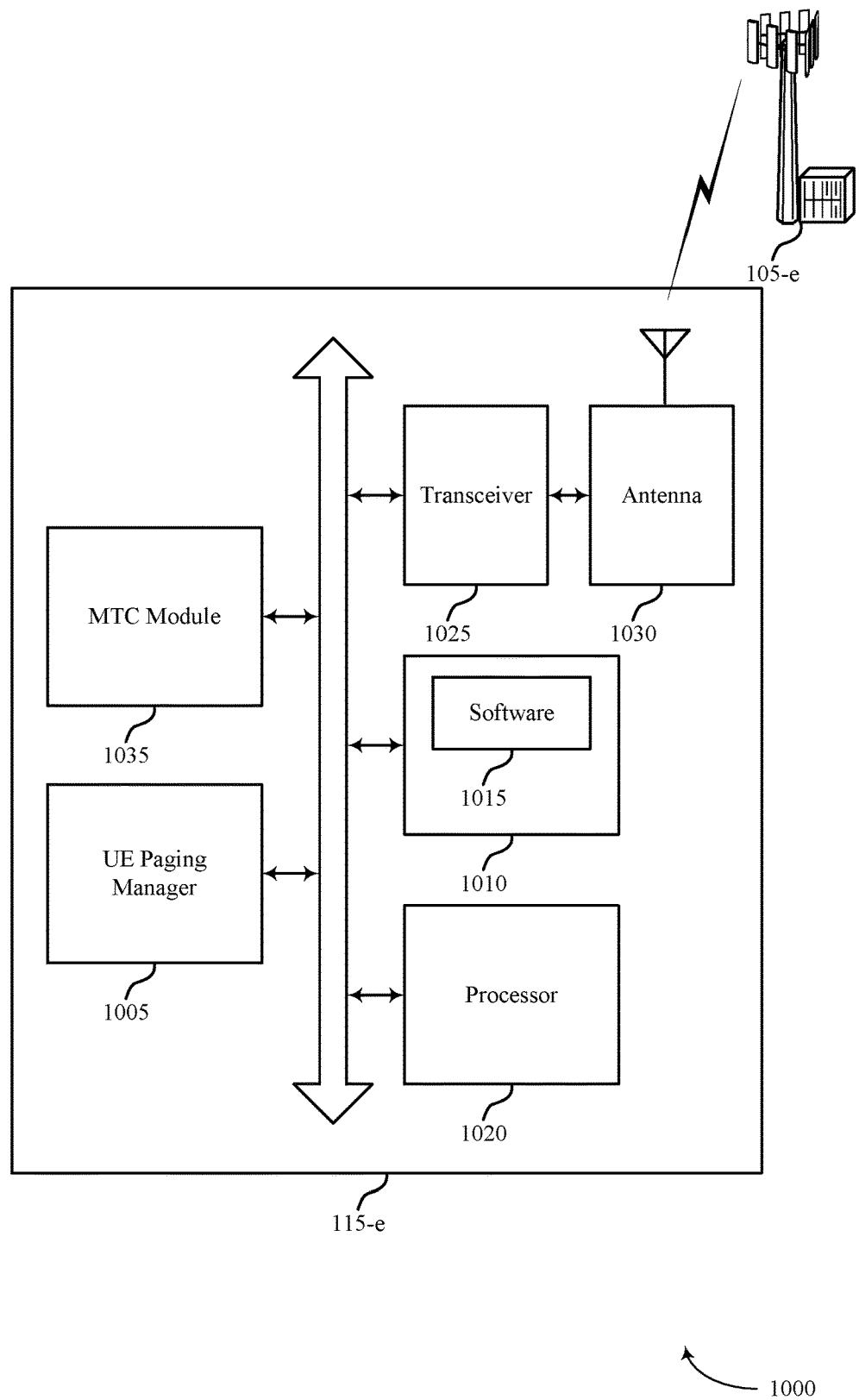
FIG. 10 illustrates a block diagram of a system including a UE that supports paging for MTC devices in accordance with aspects of the present disclosure.

FIG. 10 shows a diagram of a system 1000 including a device that supports paging for MTC devices in accordance with various aspects of the present disclosure. For example, system 1000 may include UE 115-*e*, which may be an example of a wireless device 700, a wireless device 800, or a UE 115 as described with reference to FIGS. 1, 2 and 7 through 9.

UE 115-*e* may also include UE paging manager 1005, memory 1010, processor 1020, transceiver 1025, antenna 1030 and MTC module 1035. Each of these modules may communicate, directly or indirectly, with one another (e.g., via one or more buses). The UE paging manager 1005 may be an example of UE paging managers 710, 810, or 910 as described with reference to FIGS. 7 through 9.

The memory 1010 may include RAM and ROM. The memory 1010 may store computer-readable, computer-executable software including instructions that, when executed, cause the processor to perform various functions described herein (e.g., paging for MTC devices, etc.). In some cases, the software 1015 may not be directly executable by the processor but may cause a computer (e.g., when compiled and executed) to perform functions described herein. The processor 1020 may include an intelligent hardware device, (e.g., a CPU, a microcontroller, an ASIC, etc.)

The transceiver 1025 may communicate bi-directionally, via one or more antennas, wired, or wireless links, with one or more networks, as described above. For example, the transceiver 1025 may communicate bi-directionally with a base station 105 or a UE 115. The transceiver 1025 may also include a modem to modulate the packets and provide the modulated packets to the antennas for transmission, and to demodulate packets received from the antennas. In some cases, the wireless device may include a single antenna 1030. However, in some cases the device may have more than one antenna 630, which may be capable of concurrently transmitting or receiving multiple wireless transmissions.

MTC module 1035 may enable MTC and IoT operations such as operation within a narrowband range as described above with reference to FIGS. 1 and 2.

Figure 11:
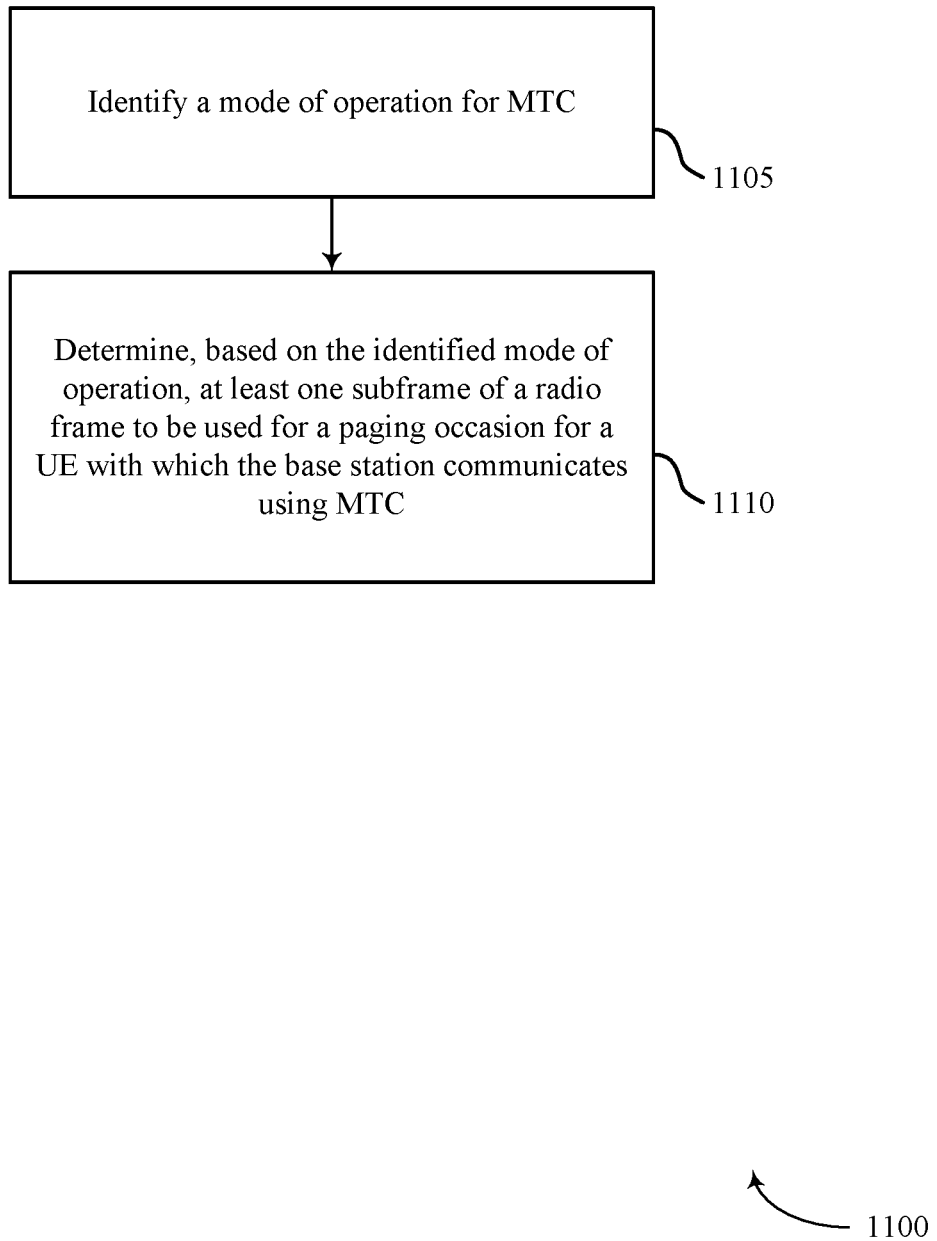
FIGS. 11 through 16 illustrate methods for paging for MTC devices in accordance with aspects of the present disclosure.

FIG. 11 shows a flowchart illustrating a method 1100 for paging for MTC devices in accordance with various aspects of the present disclosure. The operations of method 1100 may be implemented by a device such as a base station 105 or its components as described with reference to FIGS. 1 and 2. For example, the operations of method 1100 may be performed by the base station paging manager as described herein. In some examples, the base station 105 may execute a set of codes to control the functional elements of the device to perform the functions described below. Additionally or alternatively, the base station 105 may perform aspects of the functions described below using special-purpose hardware.

At block 1105, the base station 105 may identify, at the base station, a mode of operation for MTC as described above with reference to FIGS. 1 and 2.

At block 1110, the base station 105 may determine, based on the identified mode of operation, at least one subframe of a radio frame to be used for a paging occasion for a UE with which the base station communicates using MTC as described above with reference to FIGS. 1 and 2. In certain examples, the operations of block 1110 may be performed by the paging component as described with reference to FIGS. 4 and 5.

Figure 12:
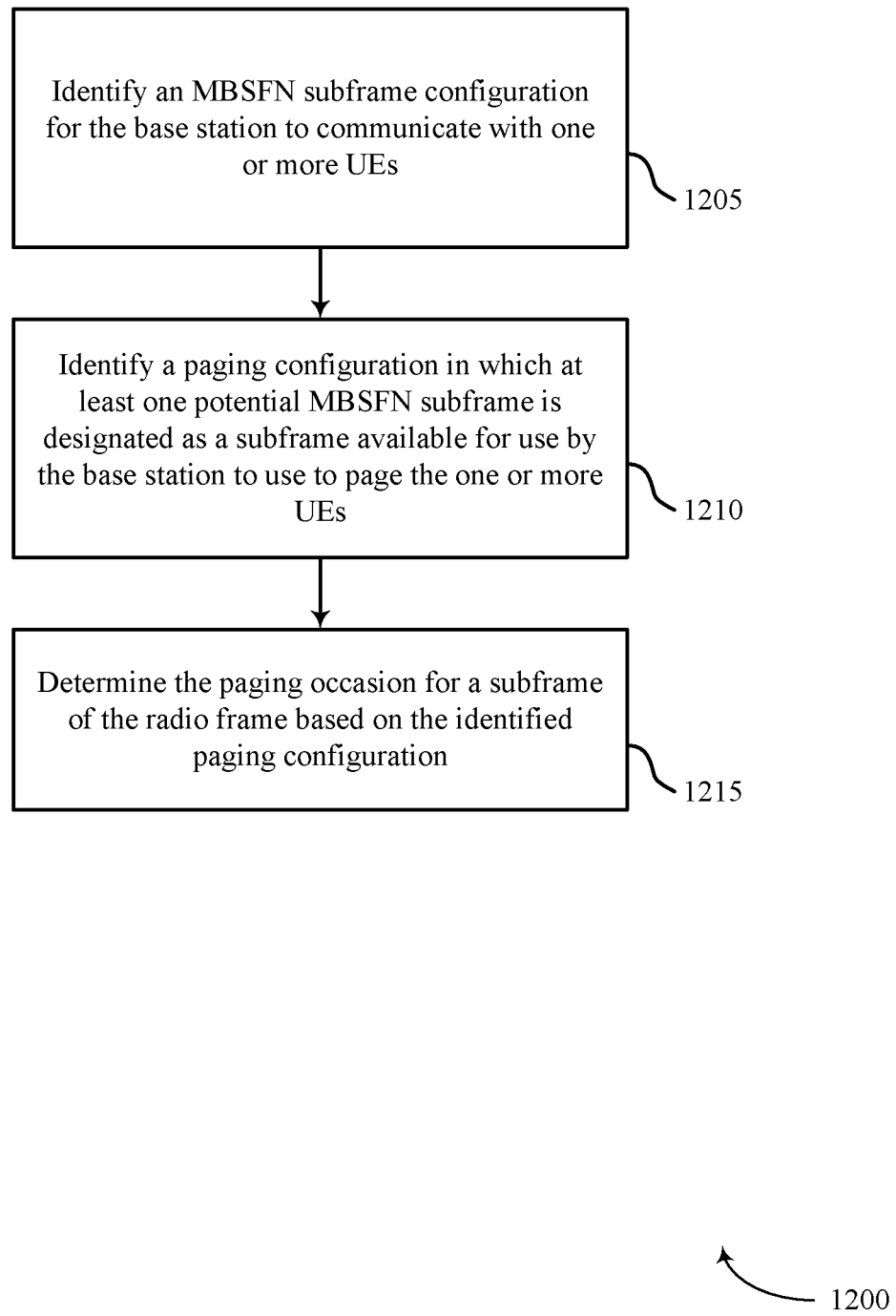

FIG. 12 shows a flowchart illustrating a method 1200 for paging for MTC devices in accordance with various aspects of the present disclosure. The operations of method 1200 may be implemented by a device such as a base station 105 or its components as described with reference to FIGS. 1 and 2. For example, the operations of method 1200 may be performed by the base station paging manager as described herein. In some examples, the base station 105 may execute a set of codes to control the functional elements of the device to perform the functions described below. Additionally or alternatively, the base station 105 may perform aspects of the functions described below using special-purpose hardware.

At block 1205, the base station 105 may identify a MBSFN subframe configuration for the base station to communicate with one or more UEs as described above with reference to FIGS. 1 and 2.

At block 1210, the base station 105 may identify a paging configuration in which at least one potential MBSFN subframe is designated as a subframe available for use by the base station to use to page the one or more UEs as described above with reference to FIGS. 1 and 2. In certain examples, the operations of block 1210 may be performed by the paging component as described with reference to FIGS. 4 and 5.

At block 1215, the base station 105 may determine the paging occasion for a subframe of the radio frame based on the identified paging configuration as described above with reference to FIGS. 1 and 2. In certain examples, the operations of block 1215 may be performed by the paging component as described with reference to FIGS. 4 and 5.

Figure 13:
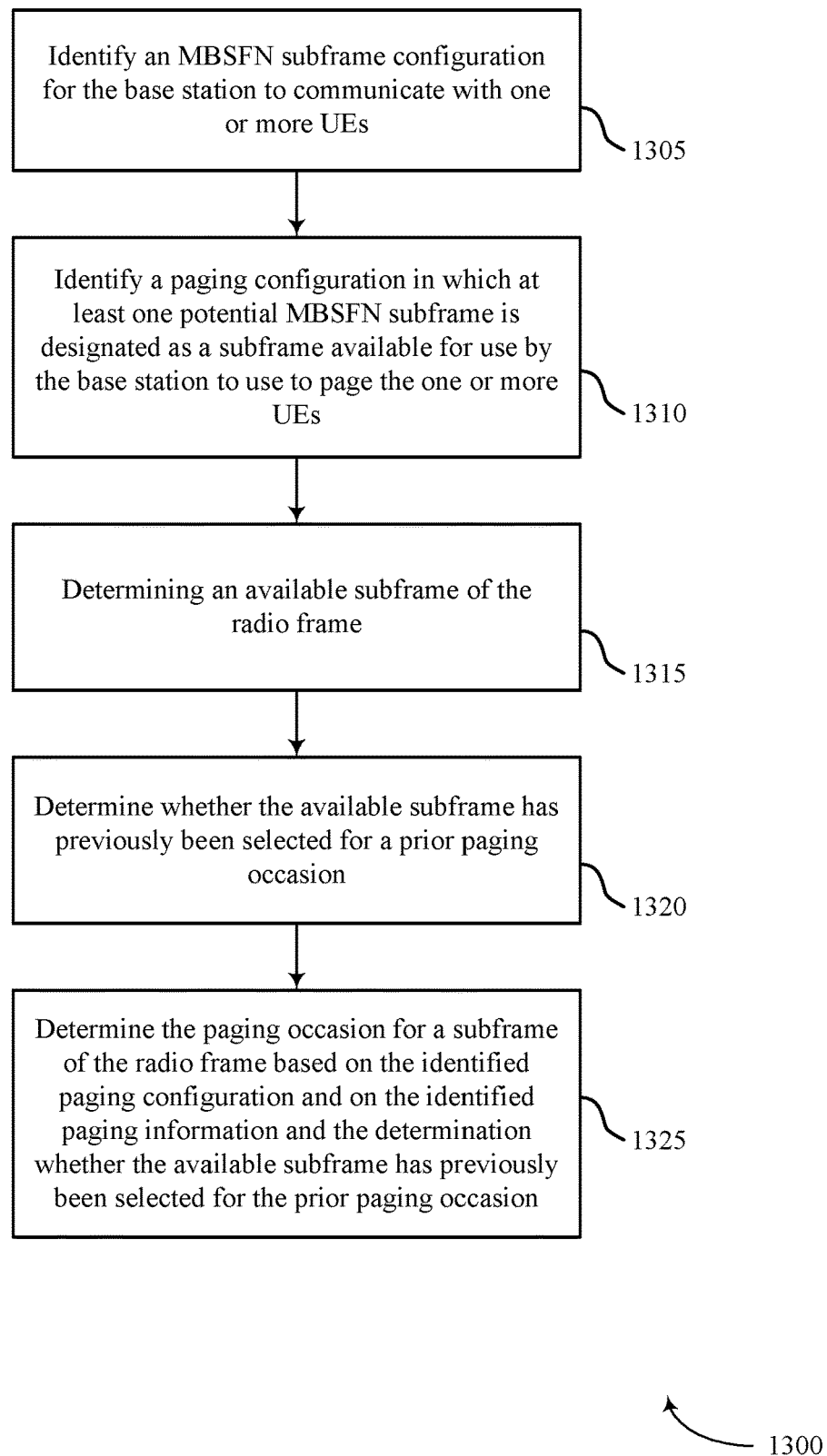

FIG. 13 shows a flowchart illustrating a method 1300 for paging for MTC devices in accordance with various aspects of the present disclosure. The operations of method 1300 may be implemented by a device such as a base station 105 or its components as described with reference to FIGS. 1 and 2. For example, the operations of method 1300 may be performed by the base station paging manager as described herein. In some examples, the base station 105 may execute a set of codes to control the functional elements of the device to perform the functions described below. Additionally or alternatively, the base station 105 may perform aspects of the functions described below using special-purpose hardware.

At block 1305, the base station 105 may identify a MBSFN subframe configuration for the base station to communicate with one or more UEs as described above with reference to FIGS. 1 and 2.

At block 1310, the base station 105 may identify a paging configuration in which at least one potential MBSFN subframe is designated as a subframe available for use by the base station to page the one or more UEs as described above with reference to FIGS. 1 and 2. In certain examples, the operations of block 1310 may be performed by the paging component as described with reference to FIGS. 4 and 5.

At block 1315, the base station 105 may determine an available subframe of the radio frame as described above with reference to FIGS. 1 and 2. In certain examples, the operations of block 1315 may be performed by the subframe availability component as described with reference to FIGS. 4 and 5.

At block 1320, the base station 105 may determine whether the available subframe has previously been selected for a prior paging occasion as described above with reference to FIGS. 1 and 2. In certain examples, the operations of block 1320 may be performed by the subframe availability component as described with reference to FIG. 5.

At block 1325, the base station 105 may determine the paging occasion for a subframe of the radio frame based on the identified paging configuration and subframe based on the identified paging information, and the determination whether the available subframe has previously been selected for the prior paging occasion as described above with reference to FIGS. 1 and 2. In certain examples, the operations of block 1325 may be performed by the paging component as described with reference to FIGS. 4 and 5.

Figure 14:
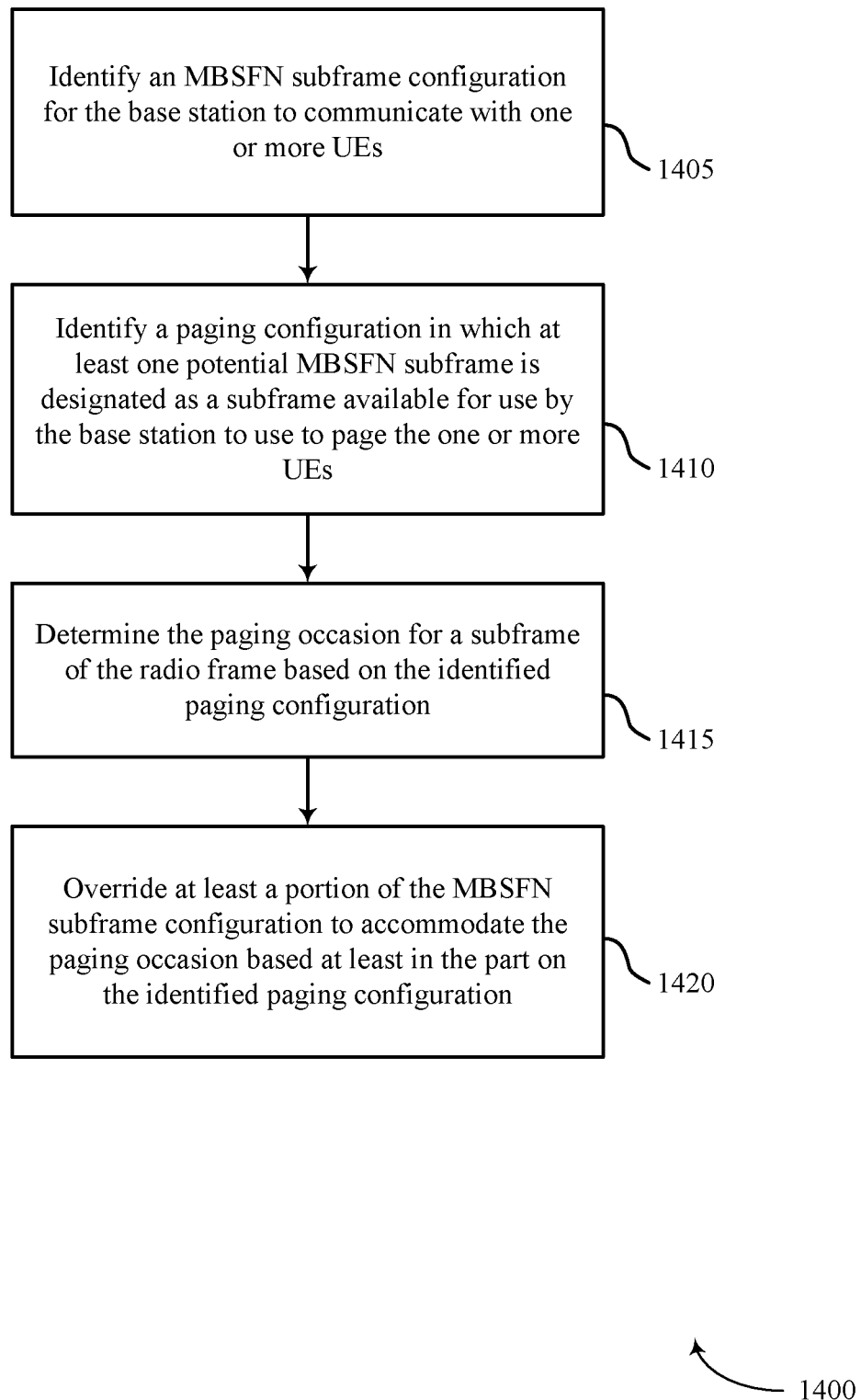

FIG. 14 shows a flowchart illustrating a method 1400 for paging for MTC devices in accordance with various aspects of the present disclosure. The operations of method 1400 may be implemented by a device such as a base station 105 or its components as described with reference to FIGS. 1 and 2. For example, the operations of method 1400 may be performed by the base station paging manager as described herein. In some examples, the base station 105 may execute a set of codes to control the functional elements of the device to perform the functions described below. Additionally or alternatively, the base station 105 may perform aspects of the functions described below using special-purpose hardware.

At block 1405, the base station 105 may identify a MBSFN subframe configuration for the base station to communicate with one or more UEs as described above with reference to FIGS. 1 and 2.

At block 1410, the base station 105 may identify a paging configuration in which at least one potential MBSFN subframe is designated as a subframe available for use by the base station to page the one or more UEs as described above with reference to FIGS. 1 and 2. In certain examples, the operations of block 1410 may be performed by the paging component as described with reference to FIGS. 4 and 5.

At block 1415, the base station 105 may determine the paging occasion for a subframe of the radio frame based on the identified paging configuration as described above with reference to FIGS. 1 and 2. In certain examples, the operations of block 1415 may be performed by the paging component as described with reference to FIGS. 4 and 5.

At block 1420, the base station 105 may override at least a portion of the MBSFN subframe configuration to accommodate the paging occasion based at least in the part on the identified paging configuration as described above with reference to FIGS. 1 and 2.

Figure 15:
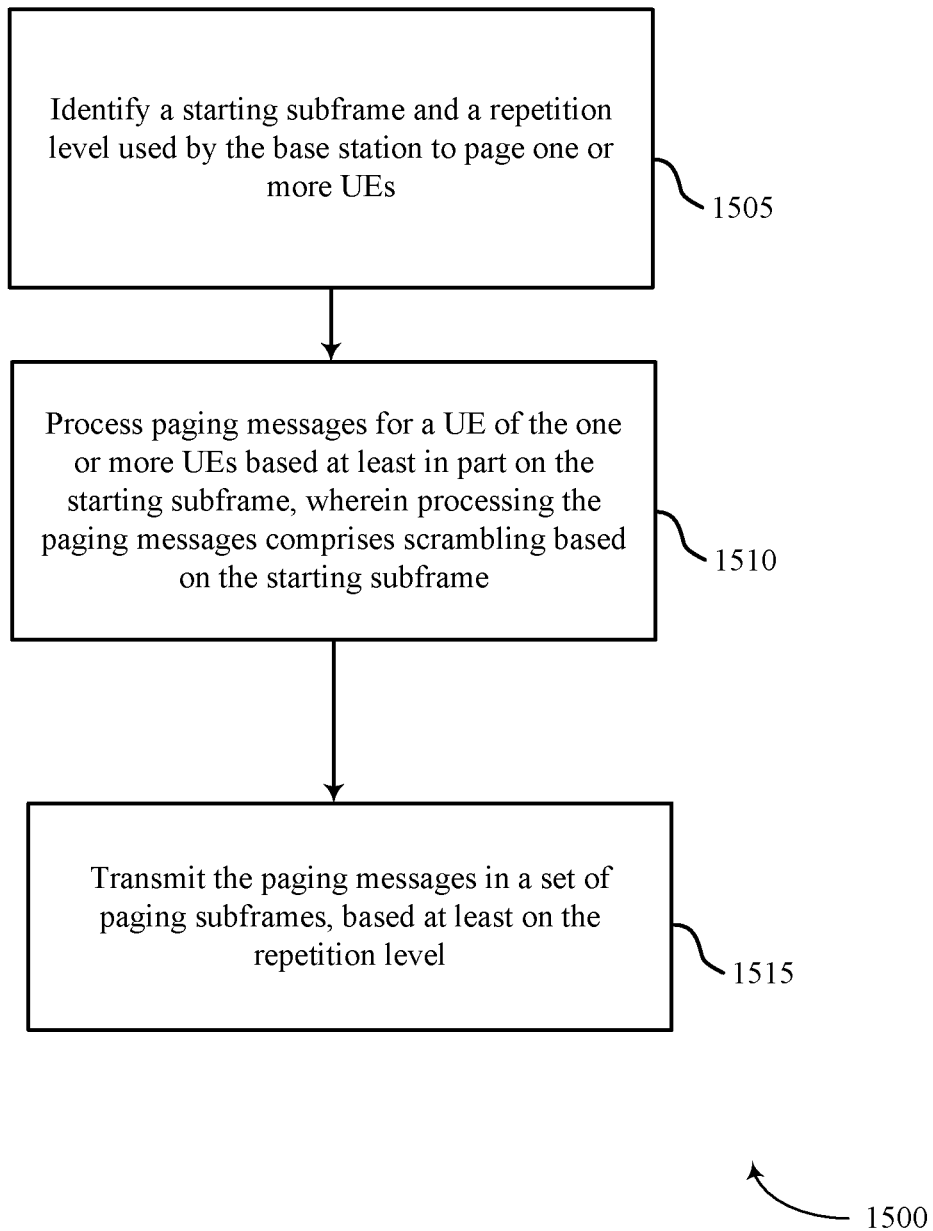

FIG. 15 shows a flowchart illustrating a method 1500 for paging for MTC devices in accordance with various aspects of the present disclosure. The operations of method 1500 may be implemented by a device such as a base station 105 or its components as described with reference to FIGS. 1 and 2. For example, the operations of method 1500 may be performed by the base station paging manager as described herein. In some examples, the base station 105 may execute a set of codes to control the functional elements of the device to perform the functions described below. Additionally or alternatively, the base station 105 may perform aspects of the functions described below using special-purpose hardware.

Method 1500 may begin when the base station 105 identifies data present at the base station to be sent to a UE 115. At block 1505, the base station 105 may identify a starting subframe for a paging occasion of the UE 115. The paging occasion may be associated with more than one UE, in some cases. The base station 105 may also identify a repetition level for paging the UE. The repetition level may be selected from a set of repetition levels used by the base station to page UEs 115 employing a coverage enhancement mode, and may be determined by the base station based on signaling from the UE (e.g., indications of path loss, etc.). The base station may signal the repetition level to the UE prior to block 1505 (e.g., using RRC signaling or broadcast signaling). In certain examples, the operations of block 1505 may be performed by the paging component as described with reference to FIGS. 4 and 5.

At block 1510, the base station 105 may process paging messages for the UE based at least in part on the starting subframe. Processing the paging messages may include scrambling the paging messages based on the starting subframe, or based on a number of prior repetitions of the paging message. In some cases, processing the paging messages may further comprise generating a DCI signal that includes an indication of the starting subframe, or scrambling a portion of the one or more paging messages with a P-RNTI associated with the starting subframe. In some cases, the generated DCI signal may be carried on a downlink control channel, such as a PDCCH.

At block 1515, the base station 105 may transmit one or more paging messages according to the repetition level in a set of paging subframes (subframes configured to carry paging), as described above with reference to FIGS. 1 and 2. In certain examples, the operations of block 1510 may be performed by the paging component as described with reference to FIGS. 4 and 5.

Figure 16:
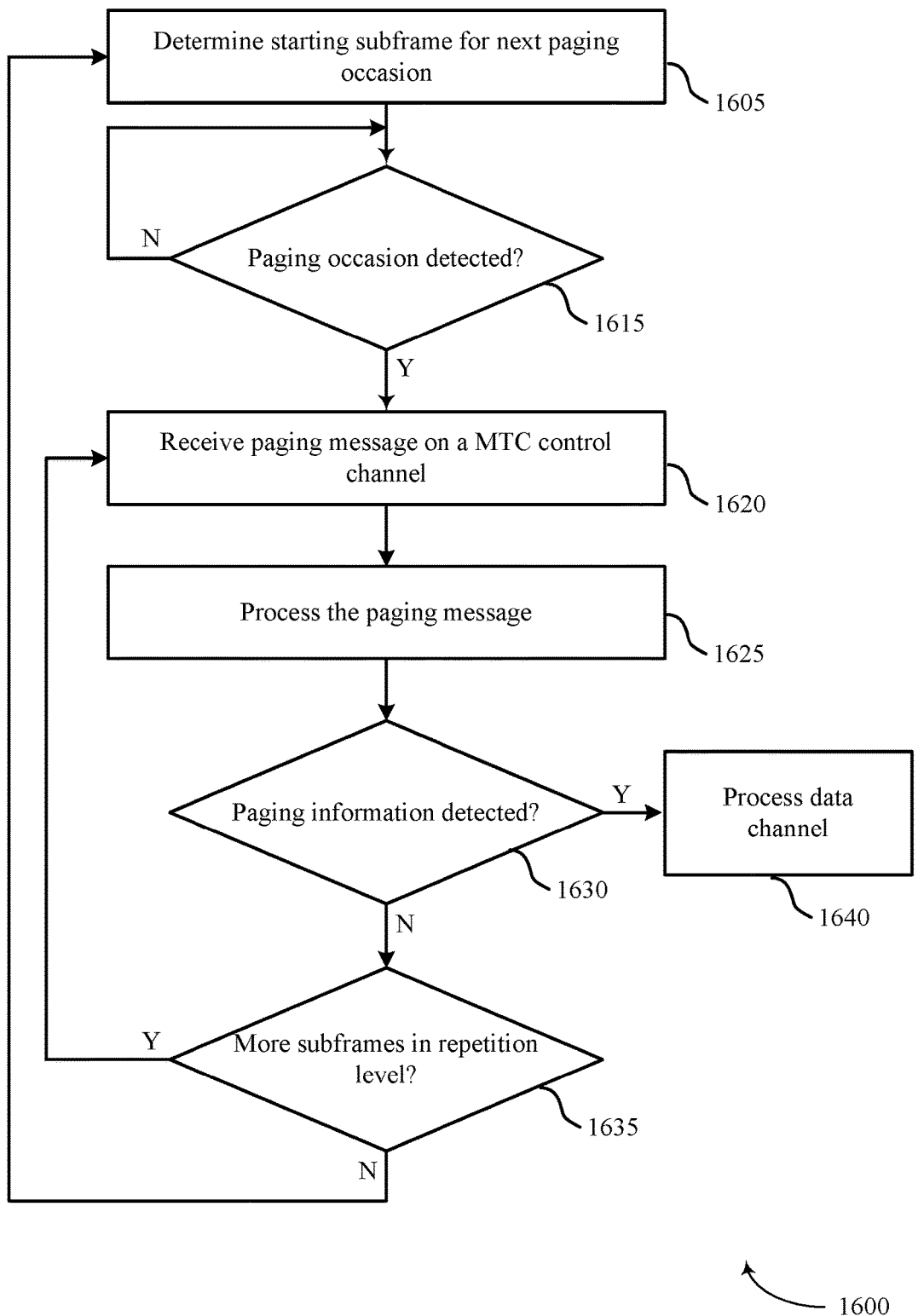

FIG. 16 shows a flowchart illustrating a method 1600 for paging for MTC devices in accordance with various aspects of the present disclosure. The operations of method 1600 may be implemented by a device such as a UE 115 or its components as described with reference to FIGS. 1 and 2. For example, the operations of method 1600 may be performed by the UE paging manager as described herein. In some examples, the UE 115 may execute a set of codes to control the functional elements of the device to perform the functions described below. Additionally or alternatively, the UE 115 may perform aspects of the functions described below using special-purpose hardware.

Method 1600 may begin when a UE 115 is in a DRX or sleep state. At block 1605, the UE 115 may determine a starting subframe for a paging occasion. For example, the paging occasion may be determined based on the ID of the UE 115, and the paging occasion may be associated with a starting subframe as described above with reference to FIGS. 1 and 2. The UE 115 may also determine a repetition level associated with paging. The repetition level may be received from the base station 105 during a previous connected state operation, for example. In certain examples, the operations of block 1605 may be performed by the paging component as described with reference to FIGS. 8 and 9.

At block 1615, the UE may detect the paging occasion. For example, the UE 115 may continue to compare the paging occasion against a current subframe number of the downlink carrier from the base station 105 until the current subframe number matches the paging occasion. If the paging occasion is detected, the UE may proceed to block 1620. In certain examples, the operations of block 1615 may be performed by the starting subframe component as described with reference to FIGS. 8 and 9.

At block 1620, the UE 115 may receive a paging message on a MTC control channel as described above with reference to FIGS. 1 and 2. In some cases, the MTC control channel may be a PDCCH, or any other downlink control channel. In certain examples, the operations of block 1605 may be performed by the paging component as described with reference to FIGS. 8 and 9.

At block 1625, the UE 115 may process the paging message. For example, the UE 115 may decode the paging message based on a descrambling sequence, or a P-RNTI, or a combination thereof, as described above with reference to FIGS. 1 and 2. The descrambling sequence or the P-RNTI may be determined based on the starting subframe. For example, the descrambling sequence may be based on the starting subframe number or a difference between a current subframe number and the starting subframe number. Additionally or alternatively, processing the paging message may include detecting an explicit indicator of the starting subframe in DCI of the control channel. In some examples, processing the paging message may include combining DCI across subframes. For example, DCI received in each subframe from the starting subframe of the paging occasion to the current subframe may be processed concurrently. In certain examples, the operations of block 1625 may be performed by the descrambling sequence component as described with reference to FIGS. 8 and 9.

At block 1630, the UE 115 may determine whether paging information for the UE is present in the paging messages. For example, the UE 115 may determine if successful decoding (e.g., CRC pass) of the paging messages is achieved when the descrambling and/or P-RNTI are applied. If paging information for the UE is found to be present at block 1630, the UE may process a data channel associated with the paging messages at block 1640. The data channel may be, for example, a PDSCH including paging records which may indicate information for the UE 115 or a further action (e.g., to perform connection setup, etc.). Processing the data channel at block 1640 may be based on an offset of the data channel to the paging occasion (e.g., offset by the repetition level, etc.). In certain examples, the operations of block 1630 may be performed by the decoder as described with reference to FIGS. 8 and 9.

If paging information is not detected at block 1630, the UE 115 may determine if more paging subframes are configured for the UE 115 at block 1635. For example, the UE 115 may determine if the repetition level has been reached or if additional paging subframes should be processed. If the repetition level has been reached, the UE 115 may return to a sleep or DRX state. The UE 115 may proceed to block 1605 to determine the next paging occasion. If the repetition level has not been reached, the UE 115 may return to block 1620 to receive and process the next paging subframe. In certain examples, the operations of block 1635 may be performed by the paging component as described with reference to FIGS. 8 and 9.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for paging for MTC devices.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different PHY locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and process 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for paging for MTC devices. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication at a base station, comprising:
    identifying a starting subframe and a repetition level used by the base station to page one or more user equipments (UEs);
    processing one or more paging messages for a UE of the one or more UEs based at least in part on the starting subframe, wherein processing the one or more paging messages comprises scrambling the one or more paging messages for transmission in a set of paging subframes with a scrambling sequence, the scrambling sequence based at least in part on the starting subframe; and
    transmitting the one or more paging messages according to the repetition level in the set of paging subframes.

2. The method of claim 1, wherein the scrambling sequence for each of the one or more paging messages is based at least in part on a number of prior repetitions of the one or more paging messages.

3. The method of claim 1, wherein transmitting the one or more paging messages comprises transmitting a downlink (DL) control channel.

4. The method of claim 1, wherein processing the one or more paging messages comprises:
    generating a downlink control information (DCI) signal of the one or more paging messages that comprises an indication of the starting subframe.

5. The method of claim 1, wherein processing the one or more paging messages comprises:
    determining a paging-radio network temporary identifier (P-RNTI) associated with the identified starting subframe; and
    scrambling a portion of the one or more paging messages with the determined P-RNTI.

6. The method of claim 5, wherein the portion of the one or more paging messages comprises a cyclic redundancy check (CRC).

7. The method of claim 1, wherein the one or more paging messages are transmitted over a downlink physical channel.

8. The method of claim 1, wherein, for each of the set of paging subframes, the scrambling sequence is based at least in part on the each of the set of paging subframes.

9. A method of wireless communication at a user equipment (UE), comprising:
    identifying a starting subframe and a set of repetition levels used by a base station to page the UE;
    receiving, from the base station, one or more paging messages over a set of paging subframes determined based on the starting subframe and the set of repetition levels;
    determining the presence of paging information for the UE based on processing the one or more paging messages based at least in part on the starting subframe and the set of repetition levels, wherein the processing the one or more paging messages for reception in a set of paging subframes comprises initializing a descrambling sequence for the one or more paging messages based at least in part on the starting subframe, and decoding the one or more paging messages based at least in part on the descrambling sequence.

10. The method of claim 9, wherein receiving the one or more paging messages comprises:
    receiving a downlink (DL) control channel.

11. The method of claim 9, wherein receiving the one or more paging message comprises:
    receiving an indication of the starting subframe in a downlink control information (DCI) signal.

12. The method of claim 9, wherein processing the one or more paging messages comprises:
    determining a paging-radio network temporary identifier (P-RNTI) associated with the identified starting subframe; and
    decoding a portion of the one or more paging messages based at least in part on the determined P-RNTI.

13. The method of claim 12, wherein the portion of the one or more paging messages comprises a cyclic redundancy check (CRC).

14. The method of claim 9, wherein the one or more paging messages are received on a physical downlink control channel (PDCCH).

15. The method of claim 9, wherein the one or more paging messages are received over a downlink physical channel.

16. The method of claim 9, wherein, for each of the set of paging subframes, the scrambling sequence is based at least in part on the each of the set of paging subframes.

17. An apparatus for wireless communication at a base station, comprising:
    means for identifying a starting subframe and a repetition level used by the base station to page one or more user equipments (UEs);
    means for processing one or more paging messages for a UE of the one or more UEs based at least in part on the starting subframe, wherein the means for processing the one or more paging messages comprises scrambling the one or more paging messages for transmission in a set of paging subframes with a scrambling sequence, the scrambling sequence based at least in part on the starting subframe; and
    means for transmitting the one or more paging messages according to the repetition level in the set of paging subframes.

18. The apparatus of claim 17, wherein the scrambling sequence is based at least in part on at least one of a number of prior repetitions of the one or more paging messages.

19. The apparatus of claim 17, wherein transmitting the one or more paging messages comprises transmitting a downlink (DL) control channel.

20. The apparatus of claim 17, further comprising:
    means for generating a downlink control information (DCI) signal of the one or more paging messages that comprises an indication of the starting subframe.

21. The apparatus of claim 17, wherein the means for processing the one or more paging messages comprises:
    means for determining a paging-radio network temporary identifier (P-RNTI) associated with the identified starting subframe; and
    means for scrambling a portion of the one or more paging messages with the determined P-RNTI.

22. The apparatus of claim 21, wherein the portion of the one or more paging messages comprises a cyclic redundancy check (CRC).

23. The apparatus of claim 17, wherein the one or more paging messages are transmitted over a downlink physical channel.

24. The apparatus of claim 17, wherein, for each of the set of paging subframes, the scrambling sequence is based at least in part on the each of the set of paging subframes.

25. A non-transitory computer-readable medium storing code for wireless communication at a base station, the code comprising instructions executable to:
    identify a starting subframe and a repetition level used by the base station to page one or more user equipments (UEs);
    process one or more paging messages for a UE of the one or more UEs based at least in part on the starting subframe, wherein processing the one or more paging messages comprises scrambling the one or more paging messages for transmission in a set of paging subframes with a scrambling sequence, the scrambling sequence based at least in part on the starting subframe; and
    transmit the one or more paging messages according to the repetition level in the set of paging subframes.

26. The non-transitory computer-readable medium of claim 25, wherein the scrambling sequence for each of the one or more paging messages is based at least in part on at least one of a number of prior repetitions of the one or more paging messages.

27. The non-transitory computer-readable medium of claim 26, wherein the transmitting the one or more paging messages comprises transmitting a downlink (DL) physical control channel.

28. The non-transitory computer-readable medium of claim 25, wherein the instructions executable to process the one or more paging messages comprise instructions executable to:
    determine a paging-radio network temporary identifier (P-RNTI) associated with the identified starting subframe; and
    scramble at least a portion of the one or more paging messages with the determined P-RNTI.

29. The non-transitory computer-readable medium of claim 25, wherein the one or more paging messages are transmitted over a downlink physical channel.

30. The non-transitory computer-readable medium of claim 25 further comprising instructions executable to:
    generate a downlink control information (DCI) signal of the one or more paging messages that comprises an indication of the starting subframe.

* * * * *